(12) United States Patent
McCarthy, Jr. et al.

(10) Patent No.: US 10,371,016 B2
(45) Date of Patent: Aug. 6, 2019

(54) ELECTRICALLY LATCHING ROCKER ARM ASSEMBLY HAVING BUILT-IN OBD FUNCTIONALITY

(71) Applicant: Eaton Corporation, Cleveland, OH (US)

(72) Inventors: James Edward McCarthy, Jr., Kalamazoo, MI (US); Mark Allan Juds, New Berlin, WI (US); Douglas Anthony Hughes, Novi, MI (US); Nicholas Peter Gillette, Ceresco, MI (US); Matthew Richard Busdiecker, Beverly Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 42 days.

(21) Appl. No.: 15/577,814

(22) PCT Filed: Jun. 6, 2016

(86) PCT No.: PCT/US2016/035984
§ 371 (c)(1),
(2) Date: Nov. 29, 2017

(87) PCT Pub. No.: WO2016/197088
PCT Pub. Date: Dec. 8, 2016

(65) Prior Publication Data
US 2018/0163577 A1 Jun. 14, 2018

Related U.S. Application Data

(60) Provisional application No. 62/170,714, filed on Jun. 4, 2015.

(51) Int. Cl.
*F01L 1/18* (2006.01)
*F01L 13/00* (2006.01)
(Continued)

(52) U.S. Cl.
CPC ............ *F01L 1/185* (2013.01); *F01L 1/18* (2013.01); *F01L 13/0005* (2013.01);
(Continued)

(58) Field of Classification Search
CPC ....... F01L 1/185; F01L 2001/186; F01L 1/46; F01L 2009/0401; F01L 2009/0403;
(Continued)

(56) References Cited

U.S. PATENT DOCUMENTS 3,040,217 A 6/1959 Conrad
4,203,397 A * 5/1980 Soeters, Jr. ............ F01L 1/2405
123/198 F
(Continued)

*Primary Examiner* — Jorge L Leon, Jr.
(74) *Attorney, Agent, or Firm* — Paul V. Keller

(57) ABSTRACT

An internal combustion engine includes a cam-actuated rocker arm assembly with a solenoid-actuated latch that provides for cylinder deactivation or variable valve actuation. The solenoid is in a position where its inductance varies significantly in relation to the position of a latch pin as it translates between latching and non-latching configurations. A sensor is positioned to monitor a current or a voltage in a circuit that includes the solenoid. The sensor data is analyzed to provide diagnostic information relating to the operation of the rocker arm assembly.

19 Claims, 14 Drawing Sheets

(51) Int. Cl.
*F02D 41/22* (2006.01)
*F02D 41/00* (2006.01)
*F02D 41/20* (2006.01)

(52) U.S. Cl.
CPC ...... *F02D 41/221* (2013.01); *F01L 2001/186* (2013.01); *F01L 2013/001* (2013.01); *F01L 2105/00* (2013.01); *F01L 2800/11* (2013.01); *F01L 2810/03* (2013.01); *F01L 2820/02* (2013.01); *F02D 2041/001* (2013.01); *F02D 2041/0012* (2013.01); *F02D 2041/2058* (2013.01); *Y02T 10/40* (2013.01)

(58) Field of Classification Search
CPC ....... F01L 2009/0421; F01L 2009/0428; F01L 2009/0446; F01L 2009/0448; F01L 2009/0463; F01L 2009/0467; F01L 13/0005; F01L 2820/031
USPC ................................ 123/90.11, 90.39, 90.44
See application file for complete search history.

(56) References Cited

U.S. PATENT DOCUMENTS

| | | | |
|---|---|---|---|
| 4,762,096 A * | 8/1988 | Kamm | F01L 13/0026 123/198 F |
| 5,544,626 A | 8/1996 | Diggs et al. | |
| 5,623,897 A * | 4/1997 | Hampton | F01L 1/185 123/198 F |
| 5,896,076 A | 4/1999 | van Namen | |
| 6,318,318 B1 | 11/2001 | Jahr | |
| 8,985,074 B2 | 3/2015 | Zurface et al. | |
| 2001/0039930 A1* | 11/2001 | Nakashima | F01L 13/0005 123/90.16 |
| 2003/0111031 A1* | 6/2003 | Hendricksma | F01L 1/18 123/90.15 |
| 2008/0006232 A1* | 1/2008 | Gregor | F01L 1/185 123/90.15 |

* cited by examiner

ELECTRICALLY LATCHING ROCKER ARM ASSEMBLY HAVING BUILT-IN OBD FUNCTIONALITY

FIELD

The present teachings relate to valvetrains, particularly valvetrains providing variable valve lift (VVL) or cylinder deactivation (CDA).

BACKGROUND

Some rocker arm assemblies, such as switching roller finger followers (SRFFs), use latches to implement variable valve lift (VVL) or cylinder deactivation (CDA). There has been a long felt need to provide diagnostic systems that report whether these latches are operating as intended. But a practical system for providing that data has proven elusive.

SUMMARY

The present teachings relate to an internal combustion engine having a cylinder head, a poppet valve having a seat formed in the cylinder head, a cam shaft on which a cam is mounted, and a rocker arm assembly. The rocker arm assembly includes a rocker arm, a latch pin, and a cam follower configured to engage the cam as the cam shaft rotates. The latch pin has first and second positions, which correspond to latched and unlatched configurations of the rocker arm assembly. One of the first and second latch pin positions provides a configuration in which the rocker arm assembly is operative to actuate the poppet valve in response to rotation of the cam shaft to produce a first valve lift profile. The other of the first and second latch pin positions provides a configuration in which the rocker arm assembly is operative to actuate the poppet valve in response to rotation of the cam shaft to produce a second valve lift profile, which is distinct from the first valve lift profile, or the poppet valve is deactivated According to some aspects of the present teachings, the engine further includes a solenoid, a sensor, and a processor. The solenoid is operative to magnetically actuate the latch pin between the first position and the second position. In some of these teachings, the solenoid is operative to change a magnetic field within the rocker arm assembly, which causes the latch to actuate. The solenoid is mounted in a configuration that causes one of its electrical response characteristics, such as its inductance, to vary significantly as the latch pin translates between the first and second positions. The sensor is positioned and operative to measure a current or voltage in a circuit comprising the solenoid. The processor is programmed to analyze data from the sensor to obtain diagnostic information relating to the operation of the rocker arm assembly. The sensor and processor may be mounted off the rocker arm assembly.

In some of these teachings, the electrical response characteristic depends on whether the latch pin is in the first or the second position. The solenoid circuit may be pulsed and the response measured to query the electrical response characteristic and determine the latch pin's position. In some of these teachings, the electrical response characteristic undergoes a complex variation as the latch pin translates between the first and second positions. Such a variation may occur even if the electrical response characteristic is the same when the latch pin is in either the first or second position. The time variation of current or voltage in the circuit comprising the solenoid may be monitored during an attempt to actuate the latch pin and the data analyzed to determine whether it is consistent with a way in which the electrical response characteristic is expected to vary as the latch pin translates. If the data is not consistent with that variation, it may indicate that the attempt to actuate the latch pin was not successful.

In some of these teachings, the solenoid is mounted to the rocker arm. Mounting the solenoid to the rocker arm may place it in proximity to the latch pin, which allows the latch assembly to be compact. Rocker arm assemblies are constantly reciprocating in proximity to other moving parts. Wires running to a rocker arm-mounted solenoid may be susceptible to being caught, clipped, or fatigued and consequently short out. In some of these teachings, an electrical connection powering the solenoid is made with a spring. The spring may carry the current to the solenoid or support a conductor that carries the current.

In some of these teachings, the engine provides the latch pin with positional stability that is independent from the solenoid and makes the latch pin position stable in both the first position and in the second position. A single permanent magnet may contribute to the positional stability of the latch pin both when the latch pin is in the first position and when the latch pin is in the second position. When the latch pin is in the first position, the engine may form a first magnetic circuit that is operative to be the primary path for magnet flux from the magnet. When the latch pin is in the second position, the engine may form a second magnetic circuit that is distinct from the first magnetic circuit and is operative to be the primary path for magnet flux from the permanent magnet. This type of latch may operate on a flux-shifting principle, which allows the latch assembly to be compact and efficient. In this type of latch, the electrical response characteristic of the solenoid may be the same or very similar for both latched and unlatched configurations.

In some of these teachings, a coil is mounted off the rocker arm in a position where, through at least a portion of the rocker arm's range of motion, the coil is significantly inductively coupled with another coil that is on the rocker arm and is in the circuit comprising the solenoid. The coil in the circuit comprising the solenoid may be the solenoid itself, but in some of these teachings it is a separate coil mounted to the rocker arm. The separate coil may be connected in series or in parallel with the solenoid. In some of these teachings, a circuit comprising the coil mounted off the rocker arm is driven and a resulting time variation of current or voltage induced in the circuit comprising the solenoid is monitored and analyzed to determine the extent of inductive coupling with the coil mounted off the rocker arm and thereby obtain diagnostic information relating to the operation of the rocker arm assembly. While the solenoid may be driven with a DC current to actuate the latch pin, in some of these teachings the coil mounted off the rocker arm is driven with an AC current to diagnose the rocker arm position. In some of these teachings, one or both of the inductively coupled coils is provided by a printed circuit board. In some of these teachings, one or both of the inductively coupled coils has an air core, by which is meant the absence of a magnetic core. These characteristics may contribute to a very compact design suitable for installation in the limited space available underneath a valve cover. In some of these teachings, a coil mounted off the rocker arm is located within a narrow gap between the end of a rocker arm and the cylinder head. The narrow gap may be 5 mm or less.

In some of these teachings, the coil mounted off the rocker arm is one of a plurality of such coils connected in series or in parallel, each of which is significantly inductively coupled with a distinct coil mounted to a distinct rocker arm assembly. The circuit comprising the coils mounted off the rocker arms may be driven to simultaneously query the positions of rocker arms on a plurality of rocker arm assemblies.

In some alternative teachings, the roles of inductively coupled coils are reversed: the circuit comprising the solenoid is driven with an AC current and an induced current within the circuit comprising a coil mounted off the rocker arm is sensed and analyzed. In another alternative teaching, a permanent magnet is mounted off of the rocker arm but in sufficient proximity to the rocker arm to induce a current in a coil mounted to the rocker in conjunction with movement of the rocker arm through its range of motion. The induced current may be detected and analyzed to obtain diagnostic information relating to the operation of the rocker arm assembly. In some of these teachings, the permanent magnet is mounted to another rocker arm of the rocker arm assembly. In some of these teachings, the permanent magnet is mounted to a lash adjuster. In some of these teachings, the permanent magnet is mounted off the rocker arm assembly. An electromagnet may be used in place of the permanent magnet just as the permanent magnet may be used in place of a coil mounted off the rocker arm.

According to some aspects of the present teachings, the engine is operated by monitoring a time variation of current or voltage in the circuit comprising the solenoid. The processor analyzes the time variation to obtain diagnostic information relating to the operation of the rocker arm assembly. The diagnostic information may then be reported. The diagnostic information may relate to the valve lift profile or whether the rocker arm assembly is in an engaging configuration.

In some of these teachings, the circuit comprising the solenoid is driven with a pulse that is insufficient to actuate the latch pin. The time variation analyzed may then be one induced by the pulse. In some of these teachings, the circuit comprising the solenoid is driven to actuate the latch pin, but the time variation that is monitored takes place outside the periods when the circuit is being driven and the diagnostic information relates to whether a critical shift has taken place. If the latch pin position is stabilized magnetically, a critical shift may cause a current to be induced in the solenoid circuit. A current may also be induced on the solenoid circuit by a stationary magnetic field through which the rocker arm moves. A critical shift may involve an exceptionally rapid movement of the rocker arm, which may cause a voltage or current of exceptional size in the solenoid circuit. In some of these teachings, the solenoid circuit is monitored for such an exceptional current or voltage.

In some aspects of the present teachings, current or voltage data is collected in association with an attempt to actuate the latch pin. The data may be analyzed to determine whether actuation was successful. In some of these teachings, analyzing the data includes identifying a period over which the data can be fit by a predetermined functional form having a parameter that depends on an electrical response characteristic of the solenoid, such as inductance. A period over which the data is consistent with a constant electrical response characteristic may be a period over which the latch pin is not moving. In some of these teaching, the data is analyzed to identify a period over which current decreases in magnitude, which follows an earlier period over which current was increasing in magnitude. If the latch pin does not move, the data may be expected to follow a trend of steady approach toward an asymptotic value in accord with an exponential decay function. A temporary reversal of that trend may indicate a period over which the latch pin is in motion. In some of these teachings, the circuit comprising the solenoid is driven to actuate the latch pin from the first position to the second position and analyzing the time variation comprises determining whether it exhibits an effect caused by residual magnetism or spring forces drawing the latch pin into the second position.

In some of these teachings, voltage or current data obtained in conjunction with an attempt to actuate the latch is analyzed to determine whether the electrical response characteristic of a circuit comprising the solenoid varied over a sampling period. In some of these teachings, a first value for a parameter related to an electrical response characteristic is determined from data corresponding to an earlier portion of the sampling period. In some of these teachings, the value of that parameter may be used to provide an indication of the latch pin position at the start of the sampling period. In some of these teachings, a second value for a parameter related to an electrical response characteristic is determined from data corresponding to a later portion of the sampling period prior to the data reaching a steady state or asymptotic value. In some of these teachings, the second parameter value may be used to provide an indication of the latch pin position at the end of the sampling period. In some of these teachings a comparison between the first and second parameter values may be made to provide an indication of whether latch pin movement took place.

In some of these teachings, current or voltage data obtained in relation to an attempt to actuate the latch may be analyzed to determine when latch pin motion began and when latch pin motion ended. Latch pin motion may be determined from data indicative of a varying inductance of the solenoid circuit. An absence of latch pin motion may be determined from data indicative of a constant inductance. Current data indicative of a constant inductance may show a trend of increasing at a rate that decays with time in accord with an exponential function. The times at which motion begins and ends may be used in further analysis of the data to provide diagnostic information. In some of these teachings, the elapsed time between the beginning and end of latch pin motion may provide the basis for a diagnostic determination. In some of these teachings, the magnitude of a current or voltage at the time latch pin movement begins provides an indication of whether a latch pin is sticking.

In some of these teachings, the current or voltage data is analyzed to determine a power consumption by the solenoid after discounting resistive losses through the solenoid-containing circuit. The power consumption may be analyzed over the period from when a voltage is applied to the solenoid circuit to when the solenoid current has neared an asymptotic value. In some of these teachings, latch power consumption may be analyzed for a period over which the latch may be moving. Whether latch actuation was successful may be determined from the power consumption. In some of these teachings, a power consumption below a threshold value may indicate that latch pin actuation was not successful.

In some of these teachings, a voltage pulse is provided to a circuit comprising the solenoid. The pulse may be too small in magnitude or duration to actuate the latch pin. Current or voltage data from a circuit comprising the solenoid may be collected over a period corresponding to the pulse. The data may be analyzed to determine a parameter related to an electrical response characteristic of the circuit that depends on the latch pin position and may be used to determine the latch pin position. In some of these teachings, a second voltage pulse is also provided and data collected over a period corresponding to the second pulse. An attempt to actuate the latch may be made between the first and second pulses. A before and after comparison of the value of the parameter may be used to determine whether the latch pin moved.

In some aspects of the present these teachings, current data in a circuit comprising the solenoid is analyzed to detect induction of current in the solenoid. In some of these teachings, the latch pin is magnetized. An induced current in the solenoid circuit occurring away from any period over which the voltage applied to the solenoid circuit is intentionally varied may indicate the latch pin has shifted position unexpectedly.

The primary purpose of this summary has been to present broad aspects of the present teachings in a simplified form to facilitate understanding of the present disclosure. This summary is not a comprehensive description of every aspect of the present teachings. Other aspects of the present teachings will be conveyed to one of ordinary skill in the art by the following detailed description together with the drawings.

DETAILED DESCRIPTION

Figure 1:
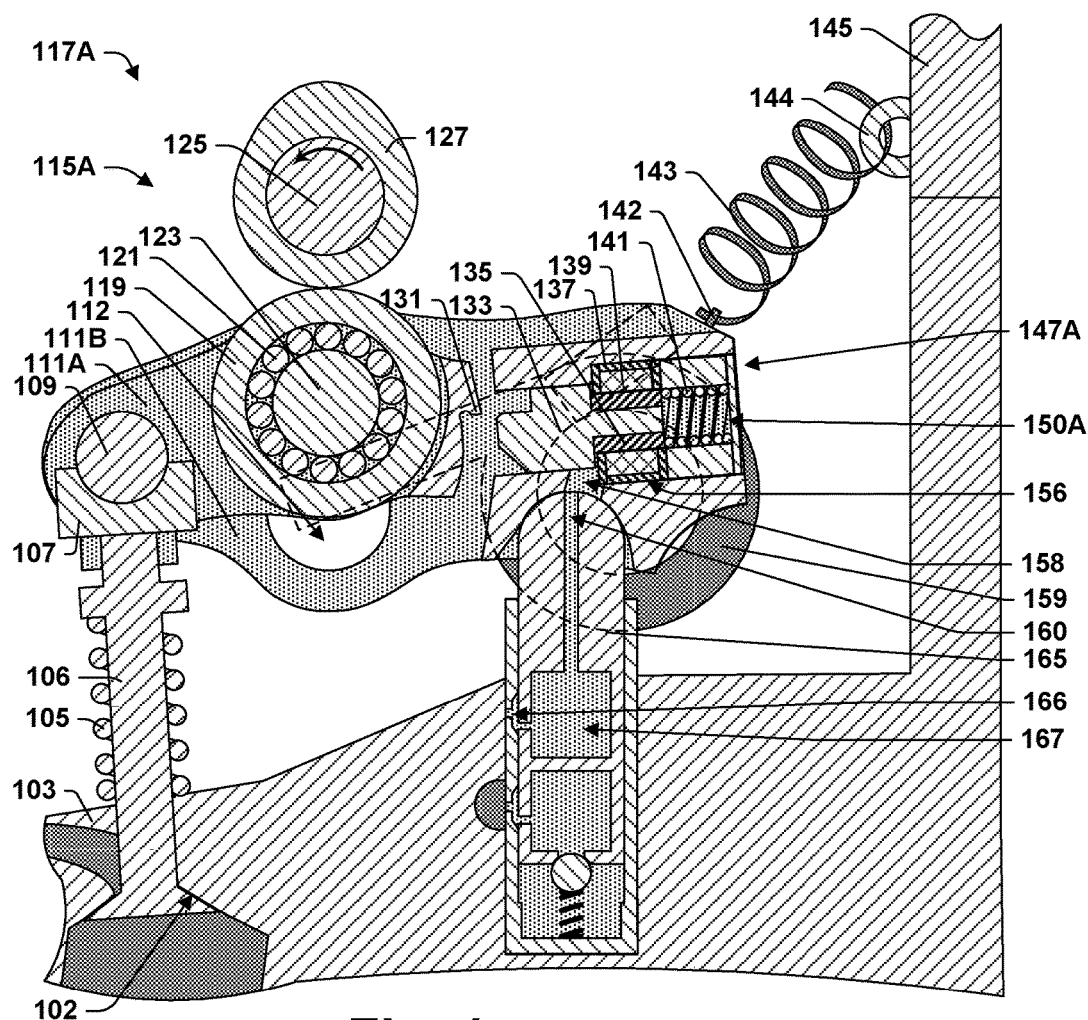
FIG. 1 is a cross-sectional side view of a portion of an internal combustion according to some aspects of the present teachings including a rocker arm assembly in a non-engaging configuration and a cam on base circle.

In the drawings, some reference characters consist of a number followed by a letter. In this description and the claims that follow, a reference character consisting of that same number without a letter is equivalent to a listing of all reference characters used in the drawings and consisting of that same number followed by a letter. For example, "internal combustion engine 117" is the same as "internal combustion engine 117A, 117B". Internal combustion engine 117 is therefore a generic reference that includes the specific instances internal combustion engine 117A and internal combustion engine 117B. Where options are provided for one instance subject to a generic reference, those options are to be given consideration in connection with all instances subject to that generic reference.

FIGS. 1-4 illustrate an internal combustion engine 117A in accordance with some of the present teachings. Referring to FIG. 1, internal combustion engine 117A includes cylinder head 103 and valvetrain 115A. Valvetrain 115A includes poppet valve 106, which has a seat 102 within cylinder head 103, cam shaft 125, on which is mounted eccentrically shaped cam 127, and rocker arm assembly 147A. Rocker arm assembly 147A may include inner arm 111A, to which cam follower 119 is mounted, outer arm 111B, and hydraulic lash adjuster 165. Both rocker arms 111 are mobile relative to cylinder head 103. Cam follower 119 may be a roller follower and is configured to engage cam 127 as cam shaft 125 rotates. Rocker arm assembly 147A is operative to transmit force from cam 127 to actuate valve 106.

Figure 2:
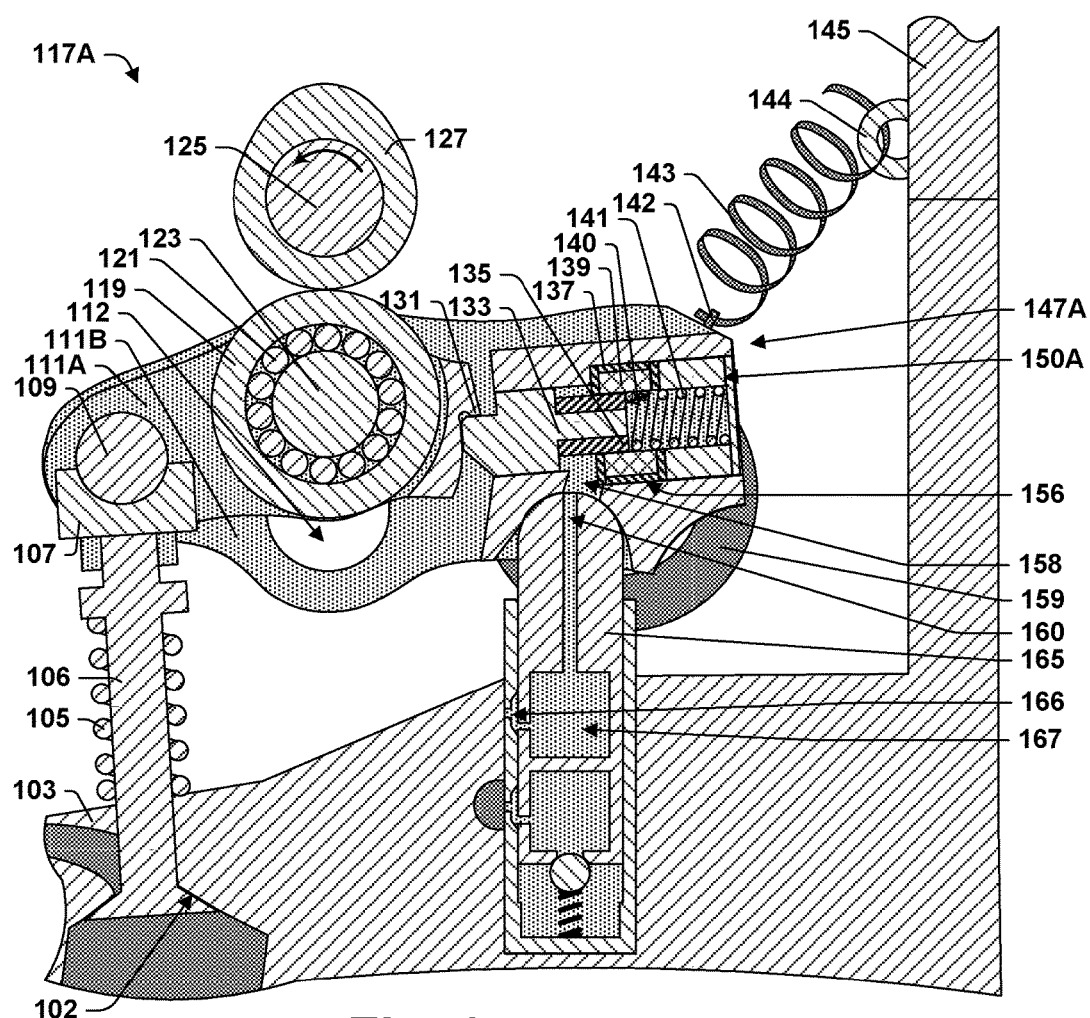
FIG. 2 provides the view of FIG. 1, but with the rocker arm assembly in an engaging configuration.

A solenoid 139, which is part of an electromagnetic latch assembly 150A, is mounted to outer arm 111B. Electromagnetic latch assembly 150A may further include a spring 141 and a latch pin 133. Latch pin 133 may be formed of a low coercivity ferromagnetic material such as soft iron. Alternatively, a low coercivity ferromagnetic part such as annular ring 135 may be mounted to latch pin 133. Latch pin 133 is translatable between extended and retracted positions. Spring 141 may bias latch pin 133 toward the extended position, which is shown in FIG. 2. Solenoid 139 may be operative when energized to exert a magnetic force on low coercivity ferromagnetic ring 135 and draw latch pin 133 to the retracted position, which is shown in FIG. 1. A shell 137 of low coercivity ferromagnetic material may be formed around solenoid 139 to provide a low reluctance pathway for magnetic flux from solenoid 139 and thereby increase the force of its action on latch pin 133.

Figure 3:
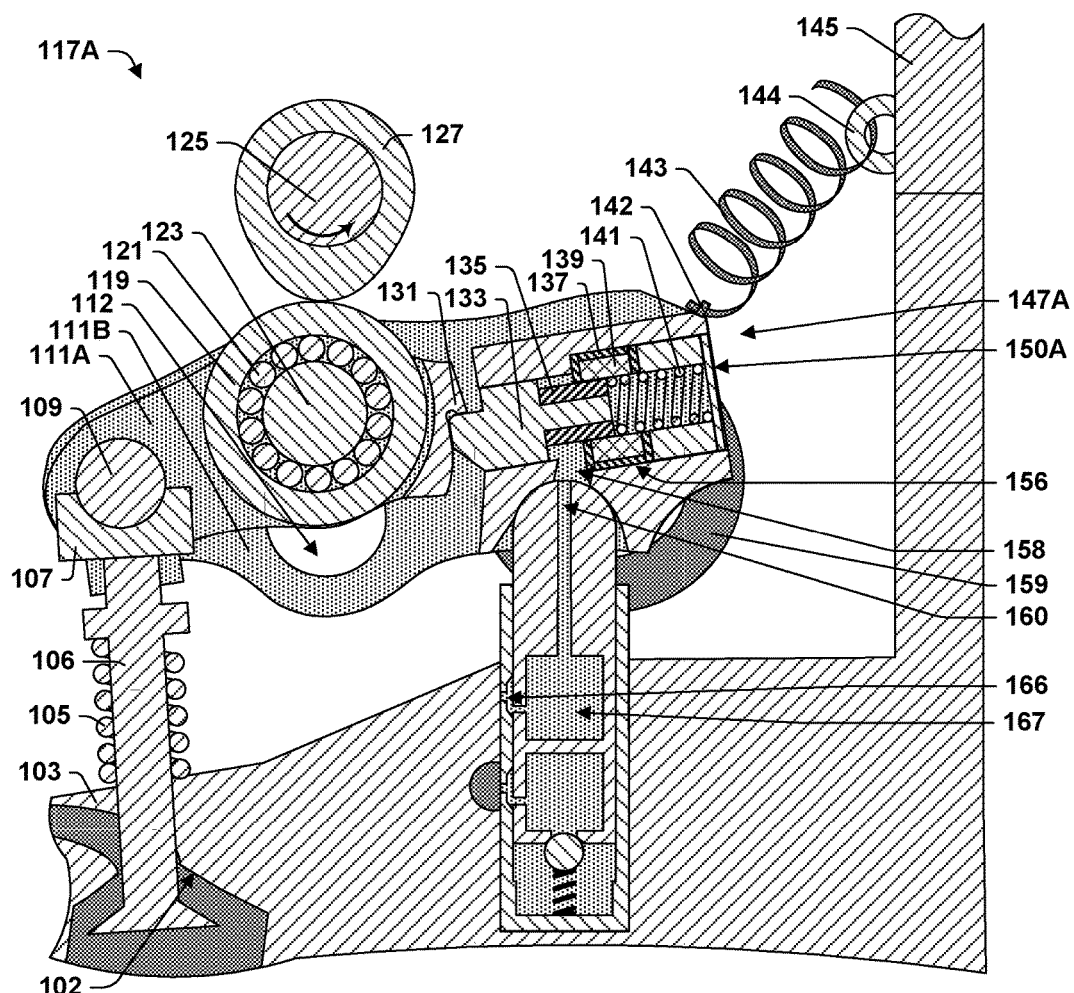
FIG. 3 provides the view of FIG. 2, but with the cam risen off base circle.

The extended position for latch pin 133 may be described as an engaging position and provides an engaging configuration for rocker arm assembly 147A. If cam 127 is rotated while latch pin 133 is in the engaging position, latch pin 133 may engage lip 131 of inner arm 111A. The force of cam 127 on cam follower 119 may then cause both inner arm 111A and outer arm 111B to pivot together on hydraulic lash adjuster 165, bearing down on valve 106 and compressing valve spring 105 as shown in FIG. 3. Valve 106 may thus be lifted off its seat 102 with a valve lift profile determined by the shape of cam 127. The valve lift profile is the shape of a plot showing the height by which valve 106 is lifted off its seat 102 as a function of angular position of cam shaft 125. In the engaging configuration, cam shaft 125 may do work in engine 117 as cam 127 rises off base circle. Much of the resulting energy may be taken up by valve spring 105 and returned to cam shaft 125 as cam 127 descend back toward base circle.

Figure 4:
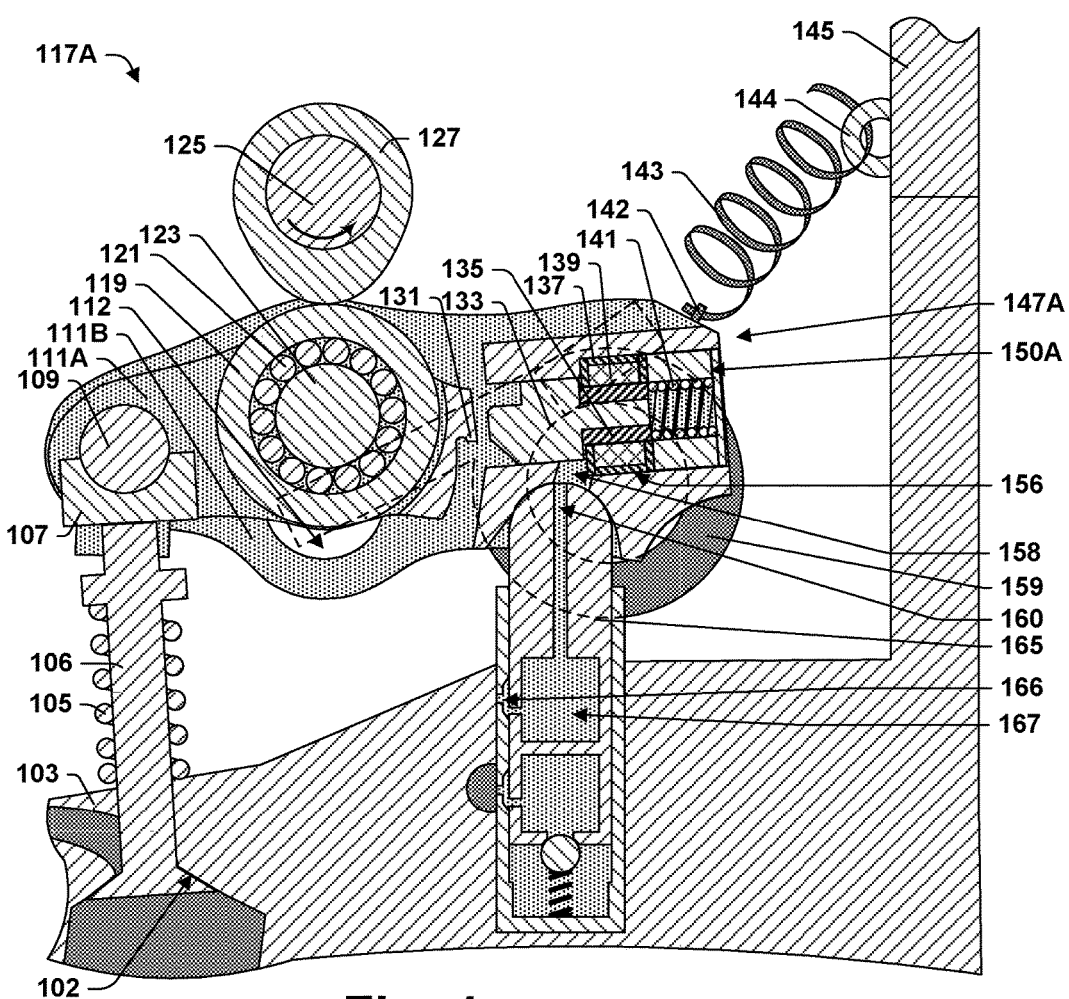
FIG. 4 provides the view of FIG. 1, but with the cam risen off base circle.

FIG. 4 shows the result if cam 127 is rotated while latch pin 133 is in the non-engaging position. The downward force on cam follower 119 may be distributed between valve 106 and torsion springs 159. Torsions springs 159 may be tuned relative to valve spring 105 such that torsion springs 159 yield in the non-engaging configuration while valve spring 105 does not. Inner arm 111A may descend as torsion springs 159 wind and outer arm 111B may remain in place. As a result, valve 106 may remain on its seat 102 even as cam 127 rotates. In the non-engaging configuration, cam shaft 125 still does work in engine 117 as cam 127 rises of base circle. But in this case most of the energy is taken up by torsions springs 159, which act as lost motion springs.

Electromagnetic latch assembly 150A may be powered in any suitable manner. In this example, electromagnetic latch assembly 150A is powered through a spring 143 bound at one end to rocker arm 111B and at the other end to a structure mounted off rocker arm 111B, such as cam carrier 145. The bindings are made by insulated connectors 142 and 144. Connector 144 may bind one end of wire 143 to cam carrier 145, cylinder head 103, a camshaft bearing journal, or any other part that is substantially stationary relative to cylinder head 103. Spring 143 may have a natural frequency of 500 Hz or greater to dampen oscillations caused by motion of rocker arm 111B. Spring 143 is a coil or ribbon metal, although any suitable type of spring may be used. Rather than carry the current through spring 143, the vibration damping of spring 143 may still be used if the current is carried by a conductive trace on spring 143 or a wire bound to spring 143 along spring 143's length. A ground connection may be formed using a second spring, a second wire or conductive trace on spring 143, or through the structure of rocker arm assembly 147A.

Figure 5:
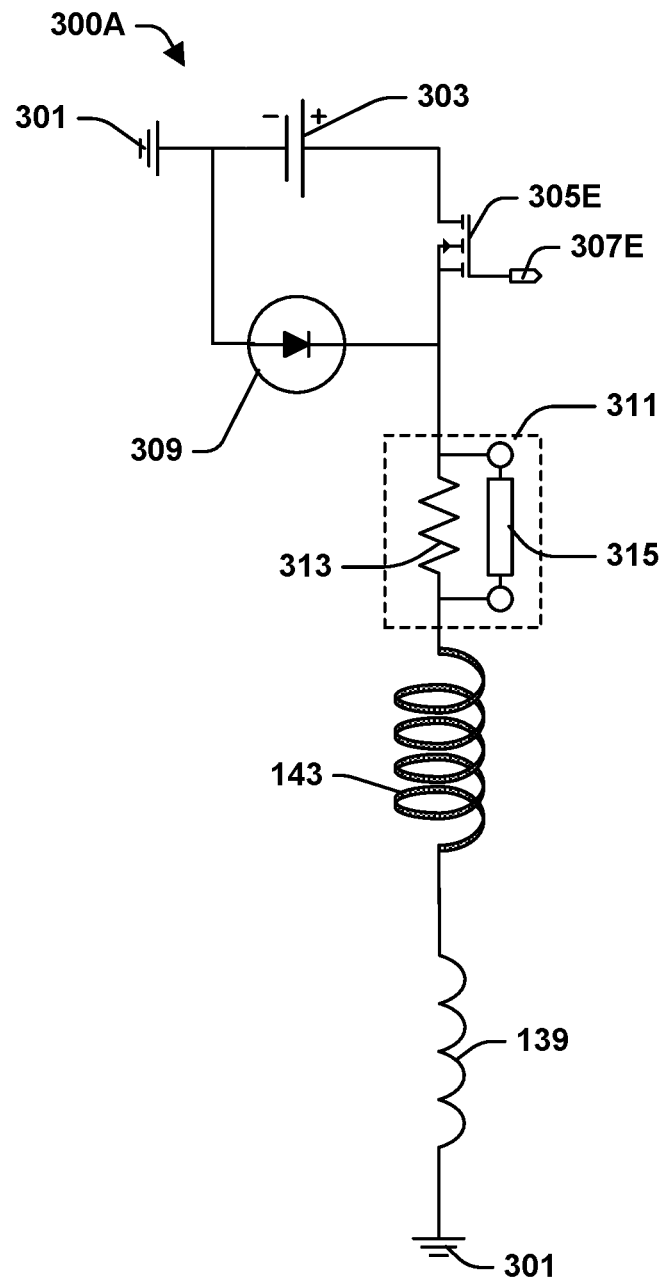
FIG. 5 illustrates a circuit in accordance with some aspects of the present teachings.

Solenoid 143 may be connected in a circuit 300A for which FIG. 5 provides an example. Circuit 300A includes solenoid 143, a DC power source 303, a switch 305E that selectively connects power source 303 to solenoid 143, a sensor 311 configured to measure current in circuit 300A, and a flyback diode 309. The components other than solenoid 139 may be mounted in positions that are off rocker arm assembly 147A and are stationary relative to cylinder head 103. A control signal 307E for switch 305E may be provided by a controller (not shown). The controller may be an engine control unit (ECU).

Figure 6:
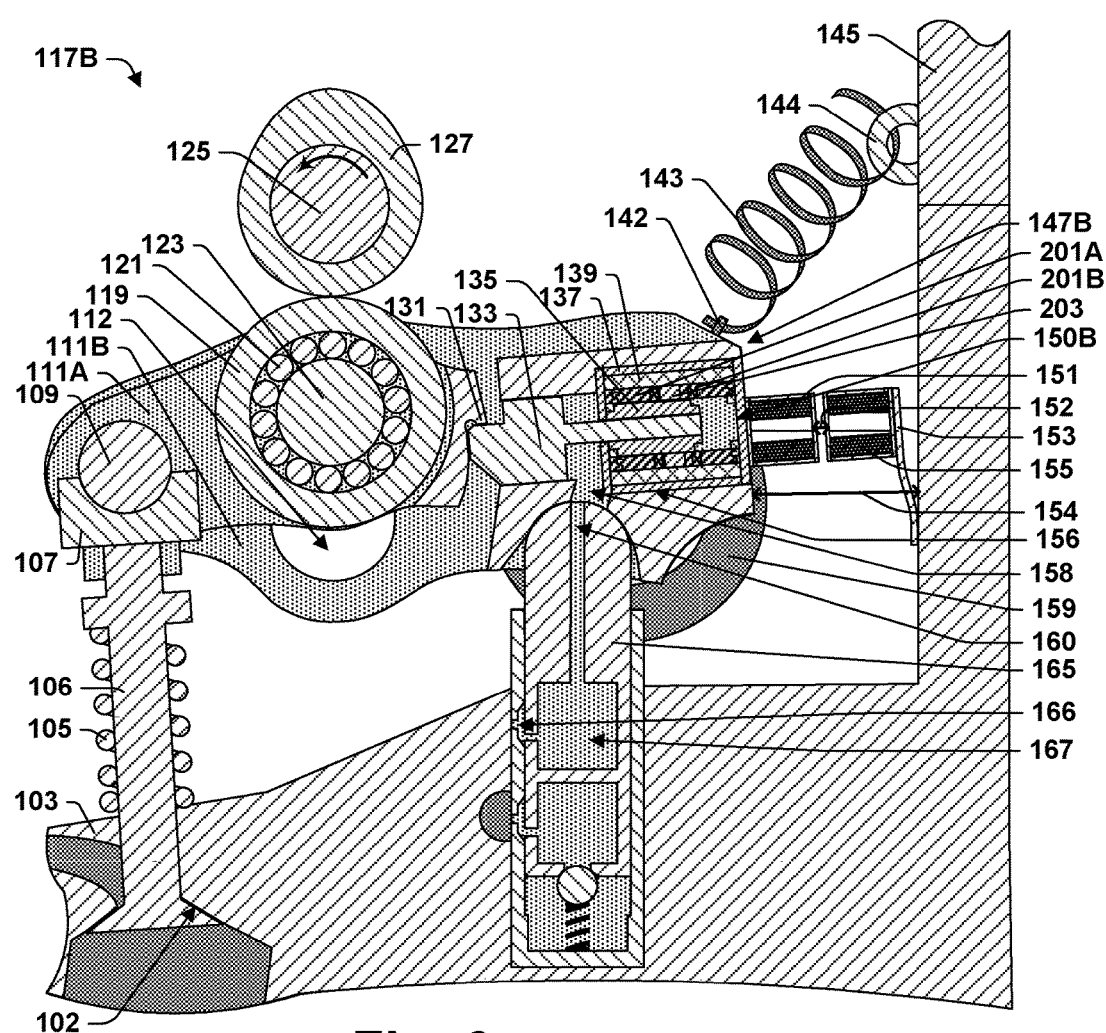
FIG. 6 is a cross-sectional side view of a portion of an internal combustion according to some aspects of the present teachings including a rocker arm assembly in an engaging configuration and a cam on base circle.
Figure 7:
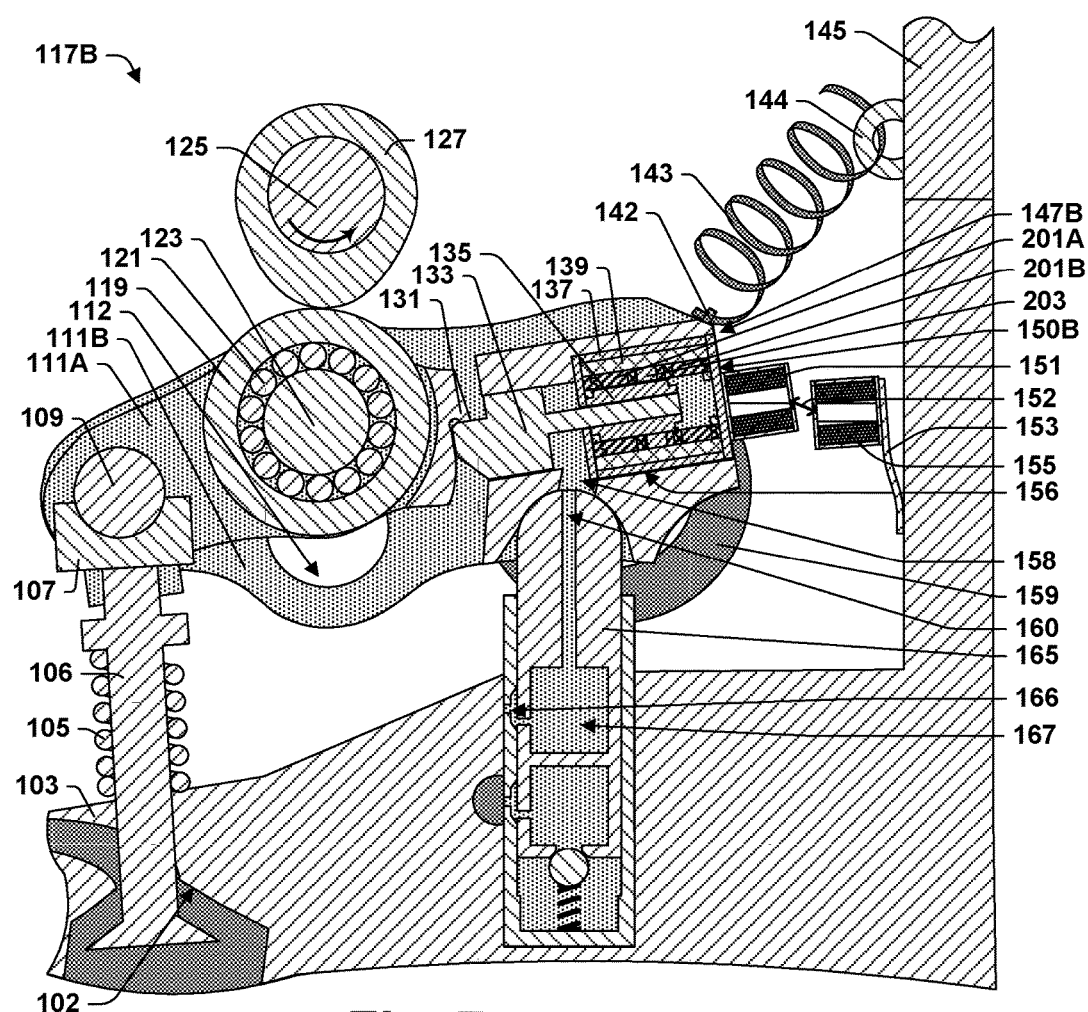
FIG. 7 illustrates the valvetrain of FIG. 6 with the cam off base circle.

FIGS. 6 and 7 illustrate an internal combustion engine 117B that may be similar in most respects to internal combustion engine 117A. Engine 117B has an electromagnetic latch assembly 150B and coils 151 and 155, which are proximate but separated by an air gap 152. Coil 151 is mounted to rocker arm 111B and is connected in series with solenoid 139. Coil 151 could alternatively be connected in parallel with solenoid 139. Coil 155 is mounted off rocker arm assembly 147B and is attached by bracket 153 to cylinder head 103. Rocker arm assembly 147B provides rocker arm 111B with a range of motion when latch pin 133 is in the engaging position as illustrated by FIGS. 6 and 7. That range of motion spans between the no-lift position illustrated by FIG. 6 where cam 127 is on base circle to the maximum lift position illustrated by FIG. 7. Coils 151 and 155 may be mutually inductively coupled throughout that range of motion, but the extent of that coupling and the size of the air gap 152 vary with motion of rocker arm 111B.

Electromagnetic latch assembly 150B includes two annular permanent magnets 201A and 201B positioned within solenoid 139 with confronting polarities and with a low coercivity ferromagnetic ring 203 between them. Permanent magnets may be rigidly mounted with respect to solenoid 139 and outer arm 111B. Electromagnetic latch assembly 150B is bi-stable in that it provides both extended and retracted positions in which latch pin 133 is stable independently from solenoid 139. As a consequence, either the latched or unlatched configuration can be reliably maintained without solenoid 139 being powered. Positional stability refers to the tendency of latch pin 133 to remain in and return to a particular position. Stability is provided by restorative forces that act against small perturbations of latch pin 133 from a stable position. In accordance with some of the present teachings, stabilizing forces are provided by permanent magnets 201. Alternatively or in addition, one or more springs may be positioned to provide positional stability. Springs may also be used to bias latch pin 133 out of a stable position, which may be useful for increasing actuation speed.

Figure 8:
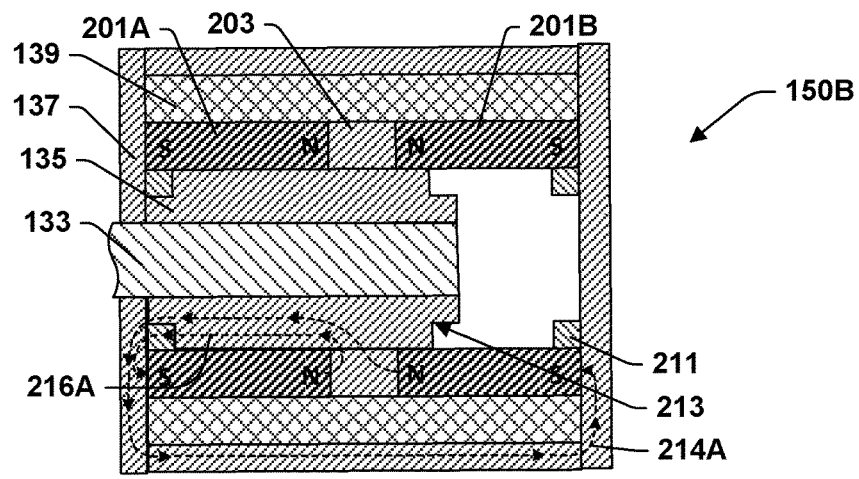
FIG. 8 is a cross-section side view of an electromagnetic latch assembly according to some aspects of the present teachings with the latch pin in an extended position.
Figure 9:
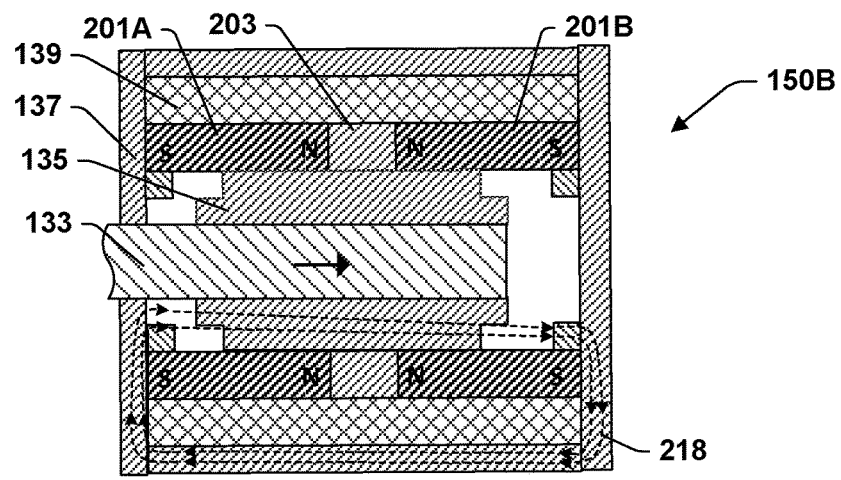
FIG. 9 provides the same view as FIG. 8, but illustrating magnetic flux that may be generated by the solenoid.
Figure 10:
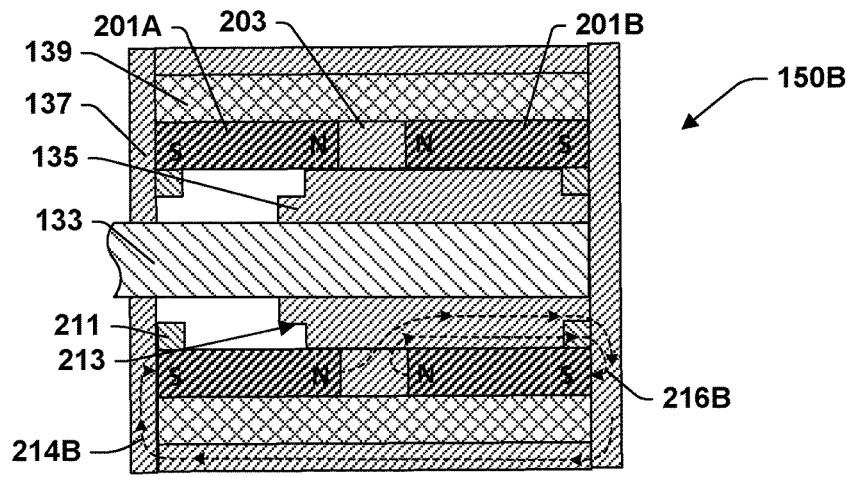
FIG. 10 provides the view of FIG. 8 but with the latch pin in a retracted position.

FIGS. 8-10 illustrate the operation of electromagnetic latch assembly 150B. FIG. 8 shows electromagnetic latch assembly 150B with latch pin 133 in the extended position. FIG. 10 shows electromagnetic latch assembly 150B with latch pin 133 in the retracted position. In FIGS. 8 and 10, solenoid 139 is de-energized. FIG. 9 illustrates latch pin 133 in a transitional state with solenoid 139 energized and driving latch pin 133.

Electromagnetic latch assembly 150B may include various low coercivity ferromagnetic elements that are operative as pole pieces and positioned to form magnetic circuits for flux from permanent magnets 201. These include pieces 137 forming a shell around solenoid 139 and annular rings 211. Annular rings 211 may be shaped to mate with stepped edges of low coercivity ferromagnetic ring 135 mounted to latch pin 133. During actuation, magnetic flux may cross an air gap between one of these stepped edge and a mating ring 211, in which case the stepped edge may be operative to increase the magnetic forces through which latch pin 133 is actuated.

As shown in FIGS. 8 and 10, permanent magnet 201A stabilizes latch pin 133 in both the extended and the retracted positions. As shown in FIG. 8, magnetic circuit 216A is operative to be the primary path for magnet flux from permanent magnet 201A when latch pin 133 is in the extended position, absent magnetic fields from solenoid 139 or any external source that might alter the path taken by flux from permanent magnet 201A. Perturbation of latch pin 133 from the extended position would introduce an air gap into magnetic circuit 216A, increasing its magnetic reluctance. Therefore, the magnetic field produced by permanent magnet 201A resists such perturbations.

As shown in FIG. 10, magnetic circuit 214B is operative to be the primary path for magnet flux from permanent magnet 201A when latch pin 133 is in the retracted position, absent magnetic fields from solenoid 139 or any external source that might alter the path taken by flux from permanent magnet 201A. Perturbation of latch pin 133 from the retracted position would introduce an air gap into magnetic circuit 214B, increasing its magnetic reluctance. Therefore, the magnetic field produced by permanent magnet 201A resists those perturbations as well.

FIGS. 8 and 10 show that permanent magnet 201B also stabilizes the position of latch pin 133 in both the extended and retracted positions. In the extended position, magnetic flux from permanent magnet 201B primarily follows circuit 214A. In the retracted position, magnetic flux from permanent magnet 201B primarily follows circuit 216B.

Electromagnetic latch assembly 150B is structured to operate through a magnetic flux path-shifting mechanism. FIG. 9 illustrates this mechanism for the case in which solenoid 139 is operated to induce latch pin 133 to actuate from the extended position to the retracted position. A voltage of suitable polarity may be applied to solenoid 139 to induce magnetic flux following the circuit 218. The magnetic flux from solenoid 139 may reverse the magnetic polarity in low coercivity ferromagnetic elements forming the magnetic circuits 214A and 216A through which permanent magnets 201 stabilized latch pin 133 in the extended position. This greatly increases the reluctance of magnetic circuit 214A and 216A. Magnetic flux from permanent magnets 201 may thus be driven to shift from magnetic circuits 214A and 216A toward magnetic circuits 216B and 214B. The net magnetic forces on latch pin 133 may drive it to the retracted position shown in FIG. 18. The total air gap in the magnetic circuit 218 taken by flux from solenoid 139 may not vary significantly as latch pin 133 actuates. This feature relates to operability through a flux path-shifting mechanism.

Magnetic circuits 216A and 216B are short magnetic circuits between the poles of permanent magnets 201A and 201B respectively. Magnetic circuits 216 pass through low coercivity ferromagnetic portion 135 of latch pin 133 but not around the coils of solenoid 139. These short magnetic circuits may reduce magnetic flux leakage and allow permanent magnets 201 to provide a high holding force for latch pin 133. Magnetic circuits 214, on the other hand, pass around the coils of solenoid 139. Routing these magnetic circuits around the outside of solenoid 139 may keep them from interfering with the shorter magnetic circuits. These longer, alternate magnetic circuits can allow permanent magnets 201 to contribute to stabilizing latch pin 133 in both extended and retracted positions and can assure there is a low reluctance magnetic circuit to help maintain the polarization of permanent magnets 201 regardless of whether latch pin 133 is in the extended or the retracted position.

As used herein, a permanent magnet is a high coercivity ferromagnetic material with residual magnetism. A high coercivity means that the polarity of permanent magnet 201 remains unchanged through hundreds of operations through which electromagnetic latch assembly 150B is operated to switch latch pin 133 between the extended and retracted positions. Examples of high coercivity ferromagnetic materials include compositions of AlNiCo and NdFeB.

While permanent magnets 201 may initially hold latch pin 133 in a first position, at some point during latch pin 133's progress toward the second position, permanent magnets 201 begin to attract latch pin 133 toward the second position. Accordingly, at some point during latch pin 133's progress, solenoid 139 may be disconnected from its power source and latch pin 133 will still complete its travel to the second position.

Electromagnetic latch assembly 150A forms an air gap 140 shown in FIG. 2. Moving latch pin 133 toward the retracted position tends to reduce air gap 140, which reduces the magnetic reluctance in a path taken by flux from solenoid 139. As a consequence, energizing solenoid 139 in electromagnetic latch assembly 150A causes latch pin 133 to move toward the retracted position regardless of the direction of the current through solenoid 139 or the polarity of the resulting magnetic field. But in electromagnetic latch assembly 150B, latch pin 133 may be moved in either one direction or another depending on the polarity of the magnetic field generated by solenoid 139.

Figure 11:
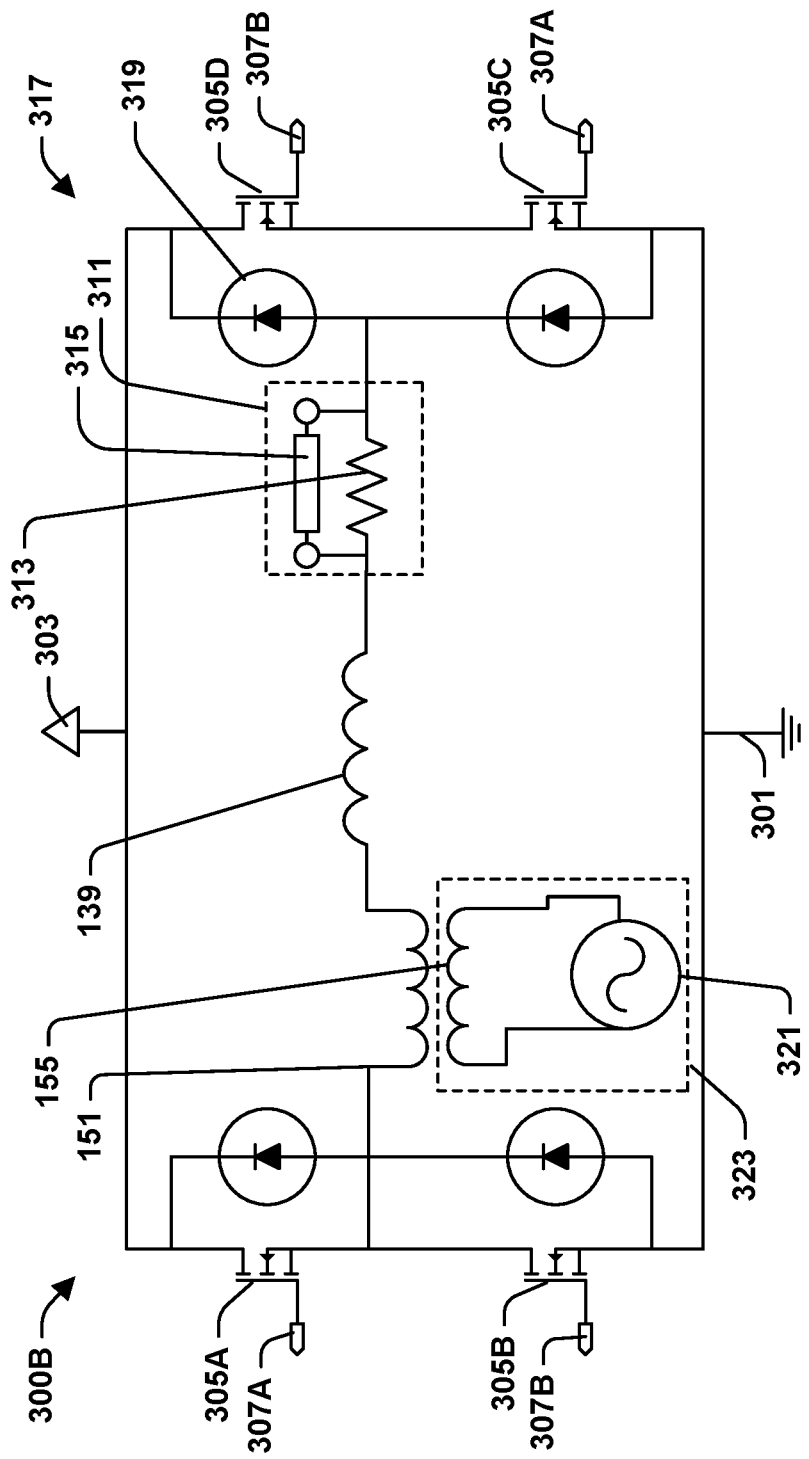
FIG. 11 illustrates a circuit in accordance with some aspects of the present teachings

FIG. 11 provides a drawing of a circuit 300B that may be used to drive solenoid 139 with a current in either a forward or a reverse direction depending on the desired polarity for the magnetic field. Circuit 300B is all of FIG. 11 except that portion identified as circuit 323. Circuit 300B includes current sensor 311, an H-bridge 317, solenoid 139, and coil 151. Coil 151 is connected in series with solenoid 139. Coil 151 is mutually inductively coupled with the coil 155 that is in circuit 323, but circuit 323 is still considered separate from circuit 300B for purposes of the present disclosure. Circuit 323 includes oscillator 321, which may be used to drive coil 155 with an AC current. Any suitable AC power source may be used. In some of these teachings, H-bridge 317 is operated to provide AC power and a distinct oscillator 321 is not required.

H-bridge 317 may be controlled through signal 307A and 307B. Signal 307A closes switches 305A and 305C allowing current from voltage source 303 to ground 301 to flow through solenoid 139 in a first direction. Signal 307B closes switches 305B and 305D allowing current from voltage source 303 to ground 301 to flow through solenoid 139 in a second direction, which is the reverse of the first direction. Signals 307A and 307B may be provided by controller (not shown).

Sensor 311 may be a current sensor that includes a shunt resistor 313 and a voltage measuring device 315 connected across shunt resistor 313. Sensor 311 may alternatively be a Hall effect sensor or any suitable type of current sensor. A voltage sensor may be used in place of a current sensor. Most of the examples provided herein describe measuring current, but substantially equivalent information may be obtainable from an appropriate voltage measurement.

In accordance with some aspects of the present teachings, magnetic components of electromagnetic latch assembly 150 are mounted within a chamber 156 formed in outer arm 111B. The magnetic component housed in chamber 156 may include solenoid 139, permanent magnets 201, or both. In accordance with some of these teachings, chamber 156 is sealed against intrusion from metal particles that may be in oil dispersed throughout the surrounding rocker arm assembly 147.

In accordance with some aspects of the present teachings, chamber 156 was designed to be a hydraulic chamber. Chamber 156 may have been adapted to house parts of electromagnetic latch assembly 150. In accordance with some of these teachings, rocker arm assembly 147 is made using rocker arms 111 put into production for use with a hydraulically actuated latch. In accordance with some of these teachings, an electric latch assembly 150 has been installed in place of a hydraulic latch. While chamber 156 is a hydraulic chamber, it need not be functionally connected to a hydraulic system. A hydraulic passage 158 may connect to chamber 156. Hydraulic passage 158 may be blocked to help seal chamber 156. In some of these teaching, hydraulic passage 158 couples with a hydraulic passage 160 formed in hydraulic lash adjuster 165.

In accordance with some aspects of the present teachings, hydraulic lash adjuster 165 may have been originally designed for use with a hydraulically latching rocker arm assembly. Accordingly, a second supply port 166 may be formed in hydraulic lash adjuster 165 and communicate with a reservoir chamber 167 in hydraulic lash adjuster 165. Cylinder head 103 may not include any provision for supplying oil to second supply port 161. Reservoir chamber 167 may be isolated from any substantial flow of hydraulic fluid in cylinder head 103. Reservoir chamber 167 and hydraulic passages communicating therewith may be essentially non-functional in engine 117.

Figure 12:
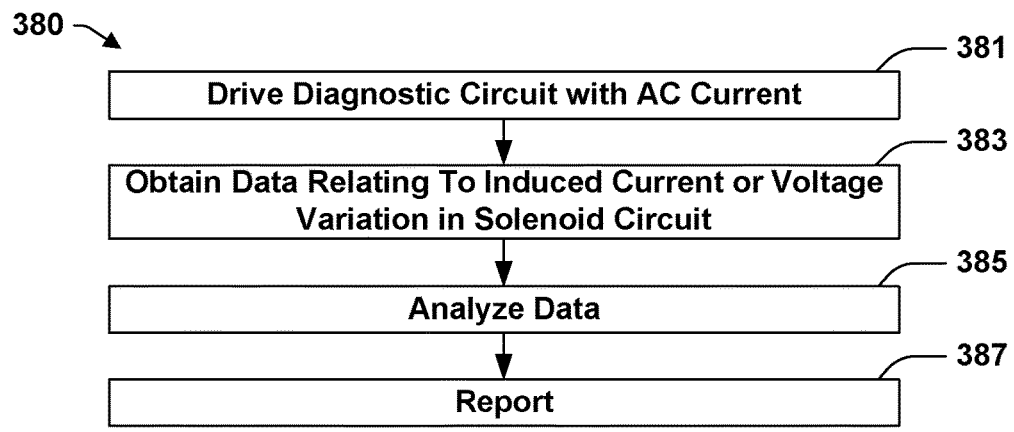
FIG. 12 is a flow chart of a method of operating an internal combustion engine in accordance with some aspects of the present teachings.

FIG. 12 provides a flow chart of a method 380 of operating internal combustion engine 117B in accordance with some aspects of the present teachings. Method 380 begins with act 381, driving coil 155 with an AC current. Coil 155 may be one of a group of coils 155, each associated with a different rocker arm assembly 147B. The coils 155 may be connected in series or parallel, whereby all may be driven simultaneously. Act 381 may induce a current in circuit 300B through inductive coupling. The inductive coupling may be with coil 151. Alternatively, the coupling may be with solenoid 139, in which case coil 151 is optional.

Act 383 is using sensor 311 to obtain data relating to a current or voltage induced in circuit 300B by act 381. Act 385 is analyzing the data to obtain information regarding the operation of rocker arm assembly 147B. Act 387 is reporting a result of that analysis. As shown in FIGS. 6 and 7, an air gap 152 between coils 151 and 155 varies in relation to the movement of rocker arm 111B through its range of motion. Air gap 152 may increase by a factor of two or more and in some cases by a factor of four or more over that range of motion. The degree of inductive coupling between coils 151 and 155 varies strongly in relation to the size of air gap 152. Accordingly, the magnitude of the current or voltage induced in circuit 300B may be indicative of the position of rocker arm 111B. In some alternative teachings, circuit 300B is driven and a current or voltage in a circuit comprising coil 155 is monitored and analyzed to provide diagnostic information that may be derived from rocker arm position data. Internal combustion engine 117B, circuit 300B, and method 380 may be modified accordingly.

Method 380 may be applied with any suitable scheduling. In some of these teachings, driving coil 155 with AC current does not affect the position or actuation of latch pin 133, in which case the diagnostic circuit 311 may be driven continuously. In some of these teachings, method 311 is applied between periods when latch pin 133 is being actuated. In some of these teachings, method 380 can be carried out in a considerably shorter period of time than is required to actuate latch pin 133 and method 311 may be interleaved with application of voltage to coil 139 to drive actuation of latch pin 133. In some of these teachings, method 380 is applied only when cam 127 is off base circle.

Figure 13:
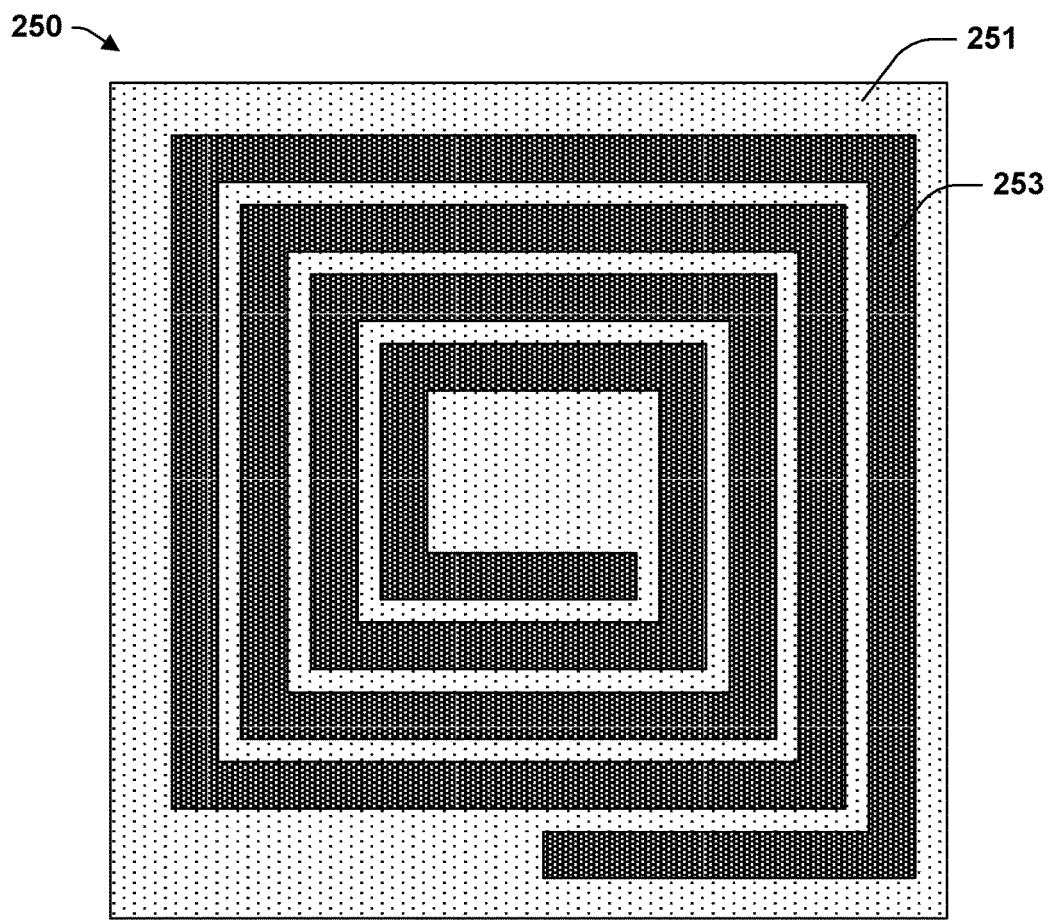
FIG. 13 illustrates a coil in accordance with some aspects of the present teachings.

Coils 151 and 155 may be smaller than illustrated in FIGS. 6 and 7. In some of these teachings, one or both of these coils have a structure such as coil 250 shown in FIG. 13. Coil 250 is formed by a conductive trace 253 on a printed circuit board (PCB) 251. Coil 250 may have an air core. Coil 250 may have any suitable spiral pattern, e.g., square (as show), circular, hexagonal, or octagonal. Mutual inductance may be highest if both coils use the square pattern. A typical design may have a 10 mm outer diameter, 0.5 mm wide traces, an 0.25 mm spacing between turns, and 10 turns. Mutual inductance may be increased by using larger coil diameters, more turns, and/or a ferromagnetic core. The distance 154 (see FIG. 6) between cylinder head 103 and rocker arm 111B may be 4 mm or less. Providing coils 151 and 155 on PCBs 251 allows both to fit within that region while maintaining a minimum spacing of 1 mm or more between coils 151 and 155.

Figure 14:
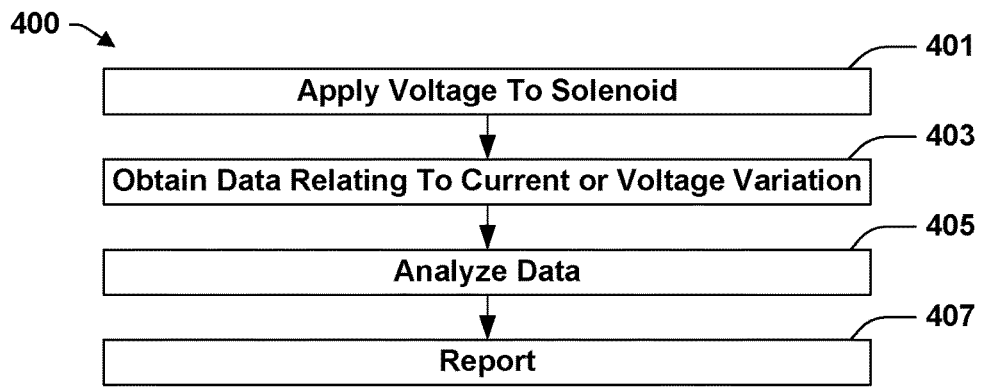
FIG. 14 is a flow chart of a method of operating an internal combustion engine in accordance with some aspects of the present teachings.

FIG. 14 provides a flow chart of a method 400 of operating internal combustion engine 117 in accordance with some aspects of the present teachings. Method 400 begins with act 401, applying a voltage to solenoid 139 in an attempt to actuate latch pin 133. Applying a voltage to solenoid 139 may include generating a control signal 307 that closes a switch 305. In a period immediately preceding act 401, there may be no current through solenoid 139. Following act 401, current may begin to flow through solenoid 139.

Act 403 is monitoring sensor 311 to obtain data relating to a time variation of current or voltage in a circuit 300 that comprises solenoid 139. The data may be obtained over a short period immediately following act 401 and the current or voltage that is measured may result from act 401. Shortly may be interpreted in terms of the time required for the current in circuit 301 to reach an approximately steady state value following a change in the applied voltage. A short period may be on the order of the length of time required to actuate latch pin 139. Actuation of latch pin 139 may be completed in less than about 50 milliseconds, typically within about 15 milliseconds.

Act 405 is analyzing the data. A controller (not shown) with suitable programming may carry out the analysis. Act 407 is reporting a result of the analysis. The report may be sending a signal, such as illuminating a warning light. In some of these teachings, reporting 407 includes recording a diagnostic code in a data storage device. The diagnostic code may later be read by a technician.

Figure 15:
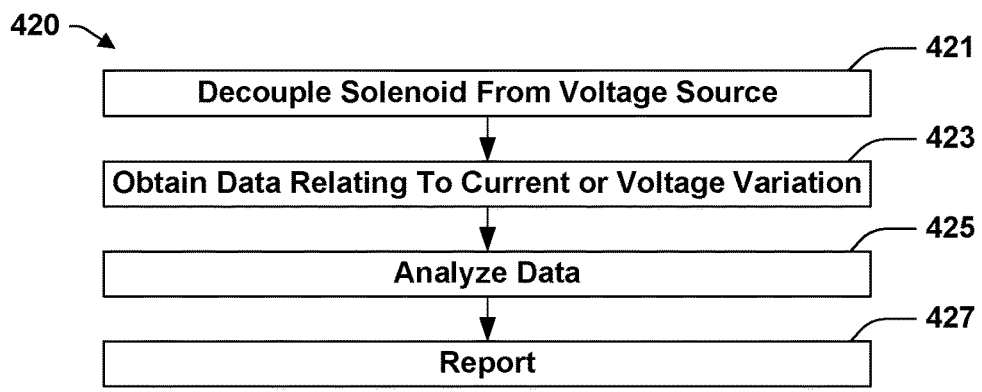
FIG. 15 is a flow chart of a method of operating an internal combustion engine in accordance with some aspects of the present teachings.

FIG. 15 provides a flow chart of a method 420 of operating internal combustion engine 117 in accordance with some aspects of the present teachings. Method 420 begins with act 421, decoupling solenoid 139 from a voltage source that was being used to drive solenoid 139. Accordingly, method 420 may be applied when solenoid 139 is in an energized state. In some of these teachings, act 421 may be an attempt to actuate latch pin 133. This may occur when method 421 is applied to an internal combustion engine 117A in which solenoid 139 is relied on to maintain one of the latched and unlatched configurations. In some others of these teachings, act 421 may follow an actuation of latch pin 133 when energy is no longer required in solenoid 139. This may occur when method 421 is applied to an internal combustion engine 117A in which latch pin 133 is stable in both extended and retracted positions. Act 421 may include opening one or more switches 305.

Act 423 is monitoring current or voltage in a circuit 300 over a period shortly following act 421. The current or voltage may be monitored in a pathway between solenoid 139 and ground 301. Act 425 is analyzing the data and act 427 is reporting a result of that analysis. These actions may be comparable to acts 405 and 407.

Figure 16:
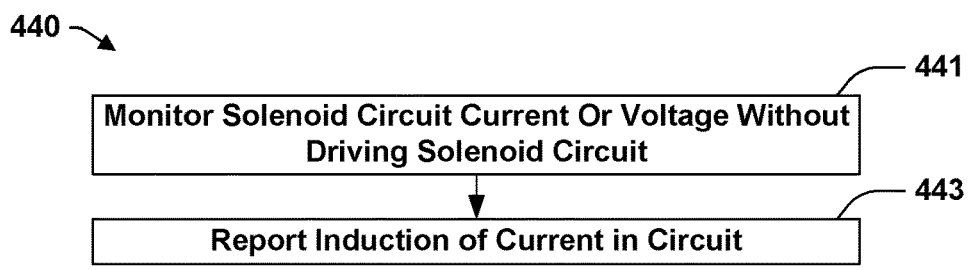
FIG. 16 is a flow chart of a method of operating an internal combustion engine in accordance with some aspects of the present teachings.

FIG. 16 provides a flow chart of a method 440 of operating internal combustion engine 117 in accordance with some aspects of the present teachings. Method 440 begins with act 441, monitoring current or voltage in circuit 300 at a time removed from any attempt to actuate latch pin 133. In some of these teachings, method 440 may be applied over a period where circuit 300 is expected to be at steady state. In some of these teachings, the steady state is an energized state with voltage applied to solenoid 139. In some of these teachings, the steady state is a grounded state with no voltage applied to solenoid 139.

Act 441 is monitoring current or voltage in circuit 300 to detect current in solenoid 139. The current may be induced in solenoid 139 if latch pin 133 moves while latch pin 133, or ferromagnetic part 135 mounted thereto, is magnetized. Such a movement may be a critical shift. A critical shift may be defined as a shift from a latched state to an un-latched occurring while a cam 107 is off base circle. If solenoid 139 is in a de-energized state, any significant current or voltage reading from sensor 311 may be indicative of an induced current. If solenoid 139 is in an energized state, any significant variation in current or voltage readings from sensor 311 may be indicative of an induced current. Act 443 is reporting if an induced current in circuit 300 is detected.

In some of these teachings, a magnetic field is provided in a position that is stationary with respect to rocker arm 111A and is such that the magnetic field is operative to induce a detectable current in solenoid 139 or coil 151 in conjunction with movement of rocker arm 111A through its range of motion. The magnetic field may be generated by a coil 155 mounted off rocker arm 111A of or by a permanent magnet, which may be provided for this purpose. The data obtained by method 440 may then be analyzed to provide diagnostic information relating to the motion of rocker arm 111A.

Figure 17:
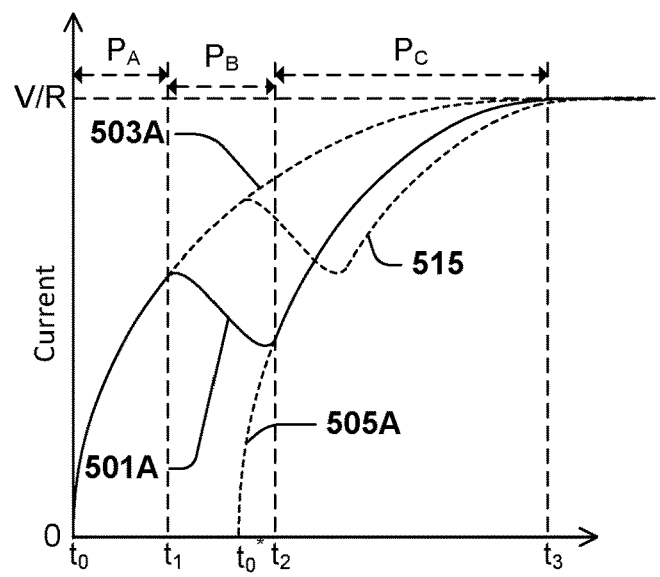
FIG. 17 plots an example of current versus time variation in a circuit comprising a solenoid over a period following connecting the circuit to a voltage source in an attempt to actuate a latch pin.
Figure 18:
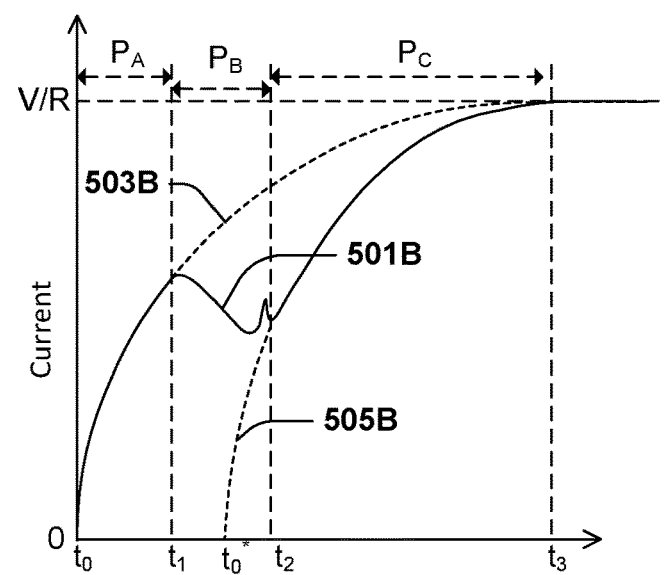
FIG. 18 plots an example of current versus time variation in a circuit comprising a solenoid over a period following connecting the circuit to a voltage source in an attempt to actuate a latch pin to a position in which the latch pin is stable.
Figure 19:
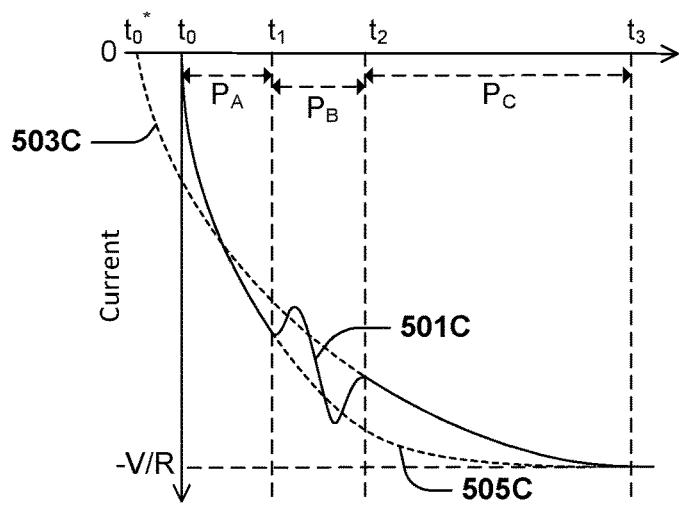
FIG. 19 plots an example of current versus time variation in a circuit comprising a solenoid over a period following connecting the circuit to a voltage source with a reverse polarity in an attempt to actuate a latch pin.

FIGS. 17-19 plot examples of current variations with time that may be observed when method 400 is applied. Curve 501A, shown in FIG. 17, plots an example of an expected variation with time of current, I, in circuit 300A if solenoid 139 is driven with potential V beginning at time $t_0$ in engine 117A. Curve 501B, shown in FIG. 18, plots an example of an expected time variation of current in circuit 300B if solenoid 139 is driven with potential V in engine 117B. Curve 501C, shown in FIG. 19, is for the case when solenoid 139 is driven with potential -V in engine 117B.

Over an initial period $P_A$, which spans from $t_0$ to $t_1$, the position of latch pin 133 remains unchanged. Period $P_A$ may last until the magnetic force exerted by solenoid 139 on latch pin 133 has built up to the point where it equals the sum of the restorative forces retaining latch pin 133 in its initial position and the frictional forces resisting translation of latch pin 133. During period $P_A$, the current may increase along the path of a curve 503A, 503B, 503C. Curves 503A, 503B, 503C represent the current versus time variations that would occur if the effective inductance, L, of circuit 300 remained at a constant value, $L_0$.

Curves 503A, 503B, 503C may follow a predetermined functional form. The functional form of may have parameters and depend on the components of circuit 300. The functional form may exhibit a monotonic increase in magnitude. The functional form may include an exponential decay toward a limit. The limit may depend only on the resistance, R, of circuit 300 and the applied voltage, V. The functional form may include a parameter depending on the inductance of circuit 300. In some of these teachings, the form is:

$$I = \frac{V}{R}(1 - e^{-(t-t_0)R/L_0}) \quad (1)$$

where $L_0$ is the inductance of circuit 300 at time $t_0$. The inductance is expected to vary with the position of latch pin 133, but the position of latch pin 133 does not vary during period $P_A$.

At time $t_1$ latch pin 133 begins to move. Latch pin 133 may continue to move over a period $P_B$ ending at a time $t_2$ at which latch pin 133 has reached its final position. Movement of latch pin 133 causes the inductance of circuit 300 to vary. This may be manifest in a departure of the current versus time relationship 501A, 501B, 501C from the functional forms of curves 503A, 503B, 503C. The variation in inductance may be in the form of an increase or a decrease. The approach of I toward its asymptotic value may slow. In some examples, a trend of increasing current magnitude may reverse: current magnitude may decrease over a portion of period $P_B$.

After period $P_B$, there follows a period $P_C$, spanning from $t_2$ to $t_3$, over which the position of latch pin 133 may remain fixed in a new position. During period $P_C$, the current may increase along the path of a curve 505A, 505B, 505C. Curves 505A, 505B, 505C may have the same functional form as curves 503A, 503B, 503C but with different parameters. For example:

$$I = \frac{V}{R}(1 - e^{-(t-t_0^*)R/L_0^*}) \quad (2)$$

This formula is the same as Equation (1) except for the change in the time constant to $t_0^*$ and the change in the inductance to $L_0^*$. The inductance $L_0^*$ may be different from $L_0$ due to the change in latch pin 133 from its initial position to its final position. The limit may be the same as the one approached by curves 503A, 503B, 503C but the exponential decay rate may be different due to the inductance of circuit 300 having changed.

The period $P_C$ ends at $t_3$. A sampling interval P for act 403 may include $P_A$, $P_B$, and $P_C$ and extend from $t_0$ to $t_3$. The time $t_3$ may be selected in any suitable fashion. In one example, $t_3$ is a fixed amount of time from the time at which voltage is applied to circuit 300. In another example, $t_3$ is determined by the current, I, having changed by less than a predetermined amount or percentage over a preceding sampling interval of a predetermined length.

Curve 501B may have a qualitative difference from curve 501A toward the end of period $P_B$. Curve 501B may be affected by a spring or magnetic force configured to stabilize latch pin 133 in its final position. As latch pin 133 approaches its final position, this stabilizing force acts to draw latch pin 133 toward that final position. Under the influence of this force, ferromagnetic element 135 may induce a current in solenoid 139. This may be manifest by an additional inflection in curve 501B. The inflection may include a rapid increase in current magnitude followed by an abrupt reduction as latch pin 133 reaches the end of its range of motion.

Curve 501C may be similar to curve 501B in many respects. But one difference is that the direction of the current is reversed. Another difference is that the inductance during period $P_C$ is greater than the inductance during $P_A$, as opposed to vice versa. A third difference may be in the shapes of curves 501B and 501C during period $P_B$ due to the stabilizing forces on latch pin 133 not being symmetrical between the extended and retracted positions.

In some aspects of the present teachings, the driving voltage for solenoid 139 may be disconnected prior to latch pin 133 reaching the end of its range of motion. The driving voltage may be disconnected after the point where a spring or magnetic force independent from solenoid 139 is sufficient to complete the movement of latch pin 133 to its final position. The final position may be an extended position as shown in FIG. 8 or a retracted position as shown in FIG. 10. In some of these teachings, the driving voltage is disconnected at a predetermined time. In some of these teaching, the driving voltage may be disconnected after detection of current induction in circuit 300B. Disconnecting the driving voltage before the motion of latch pin 133 has completed may increase the sensitivity of data obtained by sensor 311 to the behavior of latch pin 133 and thus facilitate making diagnostic determinations.

In some aspects of the present teachings, an attempt is made to actuate latch pin 133 following which current versus time data over a sampling interval P is analyzed to provide an indication of whether the attempt was successful. If latch pin 133 fails to actuate, the variation of current versus time may be expected to have a form indicative of a constant inductance such as the form of curve 503 or 505. The data may be analyzed to determine whether it corresponds to the functional form of these curves or the data may be analyzed to determine if it has characteristics of a variable inductance such as a form represented by one of the curves 501A, 501B, 501C. In some of these teachings, the data is compared to functional forms or characteristics of both types of curves to provide a more reliable diagnostic determination.

In some of these teachings, the data is analyzed to determine whether it conforms to a functional form expected if latch pin 133 fails to actuate. The analysis may include determining parameters that provide a best fit to the data given a predetermined functional form, such as that of Equation (1). In some of these teaching, $t_0$ may be taken as known from the time at which current V was applied to solenoid 139. A fixed inductance, $L_0$, that provides a best fit to the data may then be determined. In some of these teachings, both a $t_0$ and an $L_0$ may be determined in order to generate a best fit to the data. In some of these teachings, a report relating to whether actuation was successful may be made based on the values of the calculated parameters.

In some of these teachings, an error function measuring the deviation of the data from the functional form with the fitted parameters may be calculated and the report may be made based on the magnitude of the error function. An error function may be a sum of squares of differences normalized for the number, n, of current-time data points ($I_i$, $t_i$). For examples, the error function may be:

$$E = \frac{1}{n}\sum_{1}^{n}\left(I_i - \frac{V}{R}(1 - e^{-(t_i-t_0)R/L_0})\right)^2 \quad (3)$$

The value of E, or a result of comparing of E with a critical value, may be reported to provide an indication of whether latch pin 133 successfully actuated. A low value of E may be indicative of latch pin 133 not having moved.

In some of these teachings, the data is analyzed to determine whether it has a functional form or characteristics displayed by a curve 501A, 501B, 501C during or bordering period $P_B$. In some of these teachings, current data is analyzed to determine if the current data displays a trend of decreasing magnitude over some portion of period P. The presence or absence of such a trend may indicate whether latch pin 133 moved. In some of these teachings, the current data is analyzed to determine whether its second derivative has characteristics of a curve 501A, 501B, 501C. For example, any of whether the second derivative's magnitude exceeds a critical maximum, falls below a critical minimum, or changes sign may provide an indication of whether actuation of latch pin 133 was successful or not.

In some of these teachings, a first portion of the data may be analyzed to determine a starting inductance $L_0$ and a second portion of the data may be analyzed to determine a finishing inductance $L_0^*$. A comparison of these two inductances may provide an indication of whether actuation was successful. In some of these teachings, the comparison may involve taking the difference between these two inductance values. In some of these teachings, the comparison may involve forming a ratio of these two inductance values. A ratio may facilitate comparison with a predetermined threshold that is constant or varies comparatively weakly with temperature or other factors.

In some aspects of the present teachings, the data may be analyzed to determine whether latch pin 133 moved to a sufficient extent. In some of these teachings, the data may be analyzed to determine a time $t_1$ at which motion of latch pin 133 begins, a time $t_2$ at which motion of latch pin 133 ends, or both. For example, a first portion of the data may be analyzed to determine a starting inductance $L_0$ defining a curve 503A, 503B, 503C. The time at which a curve 501A, 501B, 501C deviates from a curve 503A, 503B, 503C may provide $t_1$. A second portion of the data may be analyzed to determine a finishing inductance $L_0^*$ defining a curve 505A, 505B, 505C. The time at which a curve 501A, 501B, 501C meets a curve 505A, 505B, 505C may provide $t_2$. The difference between $t_2$ and $t_1$ is the length of period $P_B$. If period $P_B$ is below a predetermined minimum, a report may be made that latch pin 133 does not appear to have moved sufficiently. In some of these teachings, a determination of whether latch pin 133 moved may be made based on a comparison between the starting inductance $L_0$ and the finishing inductance $L_0^*$. If the difference is not great enough, that may indicate that latch pin 133 did not move sufficiently. Other examples may include calculating the energy delivered to solenoid 139 over period $P_B$. If, after subtracting resistive losses in circuit 300, the energy delivered to solenoid 139 is less than a predetermined amount, it may be reported that latch pin 133 does not appear to have moved sufficiently.

In some aspects of the present teachings, the data is analyzed to determine whether latch pin 133 was in an expected position at the beginning of latch pin actuation. This may include analyzing data taken over an early portion of interval P to calculate a starting inductance $L_0$. The calculated value may be compared to an expected value. In some of these teaching, an expected value may be based on calibration. In some of these teachings, an expected value may be determined from measurements taken during previous operation of latch 133. In some of these teaching, an expected value may be indexed to or made functionally dependent on temperature. If the calculated value is not reasonably close to the expected value, then the discrepancy may be reported.

In some aspects of the present teachings, the data is analyzed to determine whether latch pin 133 reached an intended final position. This may include analyzing the data taken over a later portion of interval P to calculate a finishing inductance $L_0^*$. The calculated value may be compared to an expected value. If the calculated value is not reasonably close to the expected value, then the discrepancy may be reported.

In some aspects of the present teachings, the data may be analyzed to determine whether latch pin 133 is sticking. Curve 515 of FIG. 17 plots an example of an expected current variation with time if latch pin 133 is sticking. Sticking may be determined from the high magnitude the current reaches before latch pin 133 begins to move. That magnitude may be compared to a predetermined value. Like other predetermined values described herein, the predetermined value may be a temperature-dependent value.

Curve 501C, shown in FIG. 19, plots an example of an expected variation with time of current, I, through solenoid 139 if a potential −V is applied to circuit 300B at time $t_0$. This may be an attempt to actuate latch pin 133 from its retracted to its extended position. For an initial period $P_A$, curve 501C is expected to follows curve 505C, which is indicative of circuit 300B having a constant inductance at a value associated latch pin 133 being in a retracted position. There may follow a period $P_B$ in which the inductance is affected by motion of latch pin 133. The inductance is affected by the changing geometry and the inductive effect of latch pin 133's motion. If actuation is successful, a period $P_C$ is reached over which curve 501C may follow curve 503C, which is indicative of circuit 300 having a constant inductance at a value associated latch pin 133 being in an extended position. The case plotted in FIG. 19 is similar to that of FIG. 18 except that the current through solenoid 139 in a reverse direction and the final inductance is less than the stating inductance.

Figure 20:
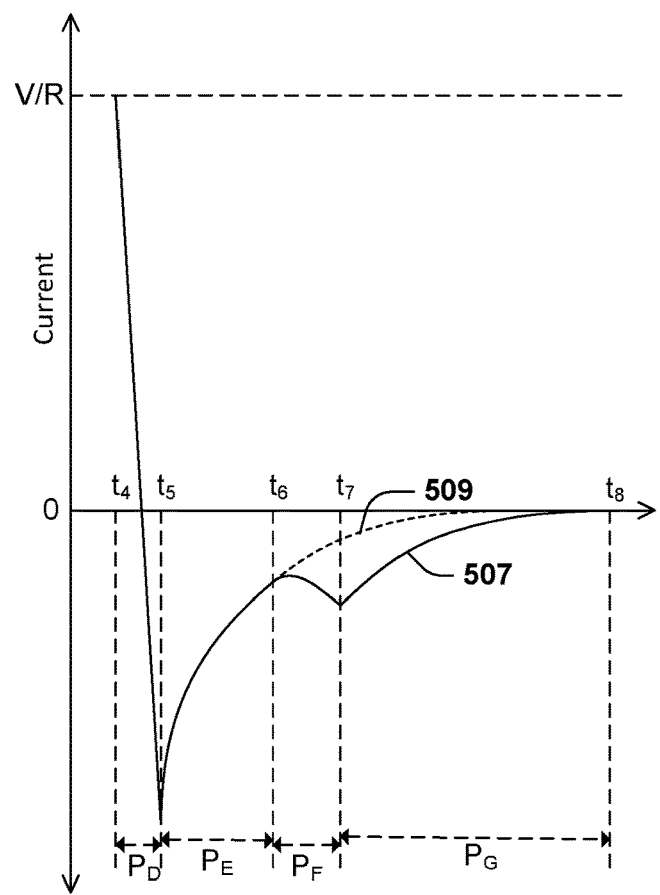
FIG. 20 plots an example of current versus time variation in a circuit comprising a solenoid following decoupling the circuit from a voltage source.

FIG. 20 plots examples of current variation with time that may be observed when method 420 is applied. In some of these teachings, latch pin 133 may be expected to actuate in response to decoupling solenoid 139 from voltage source 303. In that case, the expected variation is that of curve 507. In some of these teachings, latch pin 133 may be expected to remain in its current position when solenoid 139 is decoupled from voltage source 303. In that case, the expected variation is that of curve 509.

While solenoid 139 is energized, it may generate a magnetic field in which a significant amount of energy is stored. Most of that energy may be dissipated in a period immediately following decoupling solenoid 139 from voltage source 303. One mechanism by which this energy dissipates is inducing a reverse polarity current in a circuit 300.

A variation such as curve 507 may be expected for the case where latch pin 133 moves following decoupling solenoid 139 from voltage source 303 at time $t_4$. Over an initial period $P_D$, which extends from $t_4$ to $t_5$, the current through the circuit 300 may reverse direction. The reverse polarity current may reach a peak magnitude at $t_5$, after which it may begin an exponential decay toward zero. The decay follows curve 509. Curve 509 may follow a predetermined functional form with a parameter that depends on the inductance of the circuit 300. If latch pin 133 moves, the inductance of circuit 300 is expected to vary. Curve 507 departs from curve 509 at time $t_6$, which is when latch pin 133 begins to move. Latch pin 133 may be in motion for a period $P_F$, which extends from $t_6$ to $t_7$. During a portion of period $P_F$, the magnitude of current in circuit 300 may reverse its trend of decreasing and undergo a period of increase analogous to the behavior of curves 501A, 501B, 501C during period $P_B$. For the period $P_G$, extending from $t_7$ to the end of the sampling interval at $t_8$, curve 507 may follow a predetermined functional form having a parameter reflecting the inductance of circuit 300 when latch pin 133 is in its final position.

In some of these teachings, current or voltage data is analyzed to determine the initial position of latch pin 133 at the time solenoid 139 is decoupled from voltage source 303. In some of these teachings, the position is determined from a parameter relating to inductance of circuit 300 during period $P_E$. In some of these teachings, the position is determined from a voltage, current, or energy magnitude measured over all or part of the sampling interval. More energy may be stored in the magnetic field when latch pin 133 is in the retracted position as compared to the extended position. The energy may be estimated from an integration involving the data. The energy may also be reflected by the magnitude of a peak in a voltage or current.

In some of these teaching, the force of a spring 141 is expected to move latch pin 133 from the retracted position to the extended position. The current in circuit 300 after solenoid 139 has been decoupled from a power source may be analyzed to determine whether this movement takes place. If spring 141 drives latch pin 133 toward the extended position, residual magnetism in latch pin 133, or a ferromagnetic part 135 mounted thereto, may induce a current in solenoid 139. The energy carried by the reverse current may be less than expected if latch pin 133 does not move from the retracted position to the extended position following decoupling from the power source. If analysis of the data shows the energy was significantly less than expected or otherwise shows that the reverse current is not in conformity with expectations, that information may be reported and may indicate that latch pin 133 is stuck in the retracted position.

In some of these teaching, latch pin 133 has two stable positions and is expected to remain in the retracted position after solenoid 139 is decoupled from a power source. In this situation also, the current in circuit 300A may be analyzed to determine whether latch pin 133 moved.

Figure 21:
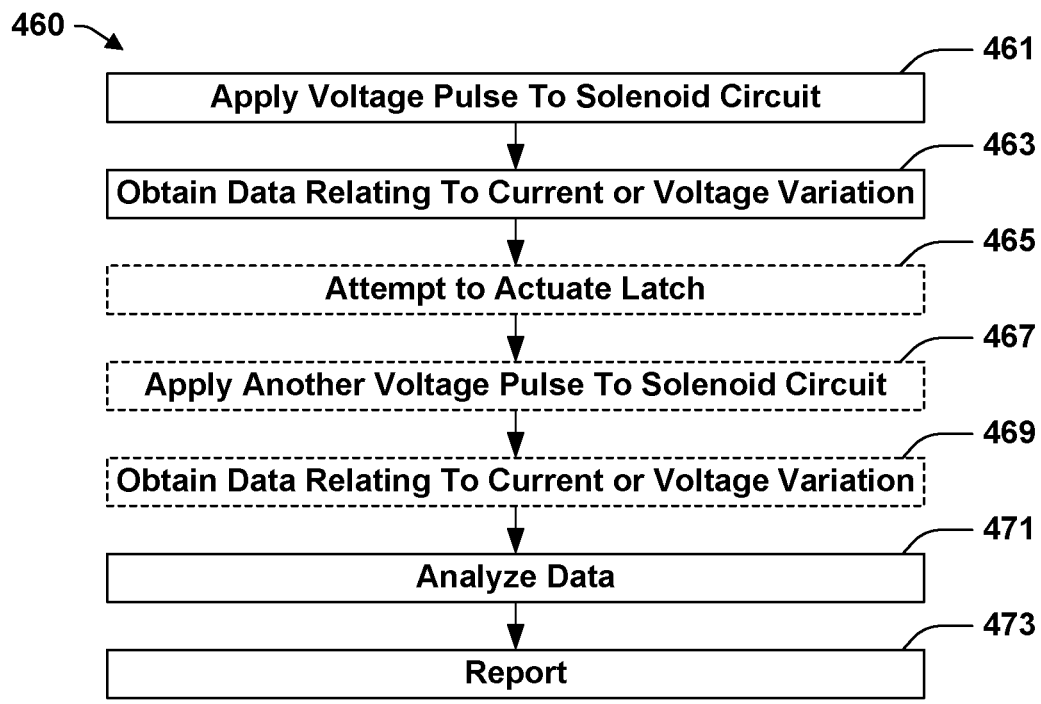
FIG. 21 is a flow chart of a method of operating an internal combustion engine in accordance with some aspects of the present teachings.

FIG. 21 provides a flow chart of a method 460 in accordance with some other aspects of the present teachings. Method 460 begins with act 461, applying a voltage pulse to circuit 300, which comprises solenoid 139. The voltage pulse may be too small in magnitude or too short in duration to affect the position of latch pin 133. Act 463 is obtaining data relating to a current of voltage variation in circuit 300 caused by the pulse. The periods of providing the pulse and collecting the data may be overlapping. Act 463 may be carried out simultaneously with act 461. In some of these teaching, the data collection period is no more than one order of magnitude greater than the period required to generate the pulse.

Acts 465-469 are optional actions that will be discussed shortly. In some of these teachings, method 460 proceeds directly to act 471, analyzing the data. The current of voltage variation monitored in act 463 may exhibit a current or voltage variation having a predetermined functional form having a parameter related to the inductance in circuit 300. The inductance may vary according to the position of latch pin 133. According, the value of the parameter related to inductance may be evaluated from the data and used to provide an indication of the position of latch pin 133, which may be reported with act 473. Evaluating the parameter value may include comparing it with one or more previously determined values. A previously determined value may depend on temperature. Previously determined values may be provided for one positions of latch pin 133 or for two positions.

Optionally, following act 463, an attempt is made to actuate latch pin 133. In some of these teachings, act 461 may be initiated in response to a command to actuate latch pin 133. In some of these teachings, act 461 may be allowed time to complete prior to carrying out the command. In some of these teachings, act 461 is carried out while cam 107 is off base circle.

Act 467 is applying a second voltage pulse to circuit 300 and act 469 is obtaining data relating to a current of voltage variation in circuit 300 caused by that pulse. Acts 467 and 469 may follow act 465 and be timed to allow actuation of latch pin 133 to be completed before they begin. Act 467 and 469 may be repetitions of acts 461 and 463. In some of these teachings, the repetitions take place from time-to-time, without reference to the scheduling of any attempt to actuate latch pin 133.

In some of these teachings where acts 467 and 469 are employed, act 471 may include comparing values of a parameter related to the inductance of circuit 300, one obtained from act 463 and the other obtained from act 469. If the values are close, that may be taken as an indication that latch pin 133 has not moved. If the values are sufficiently different, that may be taken as an indication that latch pin 133 moved between applications of the voltage pulses.

In another aspects of the present teachings, a piezoelectric device is placed between latch pin 133 and a stop for latch pin 133 in either the extended or retracted position. Data from the piezoelectric device may then be used to determine whether latch pin 133 is against the stop.

In another aspects of the present teachings, a circuit is formed that closes when latch pin 133 reaches an extended or retracted position. The circuit may include sliding contacts between latch pin 133 and a surrounding body. Brushes or rollers may be used in the contacts. In another aspects of the present teachings, two sets of such contact are used to form a potentiometer, which is a circuit with a length varies as latch pin 133 translates. The resistance of the circuit may then be used to determine latch pin position.

The components and features of the present disclosure have been shown and/or described in terms of certain teachings and examples. While a particular component or feature, or a broad or narrow formulation of that component or feature, may have been described in relation to only some aspects of the present teachings or examples, all components and features in either their broad or narrow formulations may be combined with other components or features to the extent such combinations would be recognized as logical by one of ordinary skill in the art.

The invention claimed is:

1. An internal combustion engine, comprising:
   a cylinder head;
   a poppet valve having a seat formed in the cylinder head;
   a cam shaft on which a cam is mounted;
   a rocker arm assembly comprising a rocker arm, a latch pin, and a cam follower configured to engage the cam as the cam shaft rotates, wherein the latch pin is moveable between a first position and a second position;
   a solenoid operative to actuate the latch pin and having an electrical response characteristic that varies as the latch pin translates between the first position and the second position;
   a sensor positioned and operative to measure a current or voltage in an electrical circuit comprising the solenoid; and
   a processor programmed to analyze data from the sensor to obtain diagnostic information relating to location of the latch pin or position of the rocker arm;
   wherein the first latch pin position provides a configuration in which the rocker arm assembly is operative to actuate the poppet valve in response to rotation of the cam shaft to produce a first valve lift profile; and
   the second latch pin positions provides a configuration in which the rocker arm assembly is operative to actuate the poppet valve in response to rotation of the cam shaft to produce a second valve lift profile, which is distinct from the first valve lift profile, or the poppet valve is deactivated.

2. An internal combustion engine according to claim 1, wherein:
   magnetic flux from a permanent magnet provides the latch pin with positional stability independently from the solenoid when the latch pin is in the first position and when the latch pin is in the second position;
   when the latch pin is in the first position and magnetic fields from the solenoid are absent, an operative portion of the magnet flux follows a first magnetic circuit; and
   when the latch pin is in the second position and magnetic fields from the solenoid are absent, an operative portion of the magnet flux follows a second magnetic circuit that is distinct from the first.

3. An internal combustion engine according to claim 1, wherein the solenoid is mounted to the rocker arm.

4. An internal combustion engine according to claim 3, wherein the solenoid is retrofit into a rocker arm with a chamber for a hydraulically actuated latch.

5. An internal combustion engine according to claim 3, further comprising:
   a first coil mounted to a part distinct from the rocker arm;
   wherein the rocker arm has a range of motion;
   the first coil is in a position where, through at least a portion of the range of motion, the first coil is inductively coupled with a second coil that is on the rocker arm and is in the electrical circuit; and
   the inductive coupling varies in magnitude as the rocker arm moves through the range of motion.

6. An internal combustion engine according to claim 5, wherein the second coil is distinct from the solenoid.

7. An internal combustion engine according to claim 5, wherein:
   the first coil is one of a plurality of first coils connected in series or in parallel;
   the rocker arm assembly is one of a plurality of rocker arm assemblies;
   the second coil is one of a plurality of second coils, each mounted on a respective one of the plurality of rocker arm assemblies; and
   the plurality of first coils are each inductively coupled with a respective one of the plurality of second coils.

8. An internal combustion engine according to claim 3, further comprising:
   a permanent magnet that is mounted to a part distinct from the rocker arm; and
   a coil that is mounted to the rocker arm and in the electrical circuit;
   wherein the rocker arm has a range of motion; and
   the permanent magnet is operative to induce a current in the coil as the rocker arm moves through the range of motion.

9. An internal combustion engine according to claim 1, wherein the:
   solenoid is operative to change a magnetic field within the rocker arm and thereby cause the latch pin to translate between the first position and the second position.

10. A method of providing diagnostic information for a rocker arm assembly, the method comprising:
    providing the rocker arm assembly with an electromagnetic latch assembly comprising a solenoid mounted to a rocker arm of the rocker arm assembly, wherein the rocker arm has a range of motion;

mounting a coil to a component distinct from the rocker arm assembly in a position where the coil is inductively coupled with the solenoid such that a magnitude of the inductive coupling varies as the rocker arm moves through the range of motion;

driving the coil;

monitoring a circuit comprising the solenoid for a current or a voltage resulting from driving the coil; and analyzing the current or the voltage to obtain diagnostic information relating to a position of the rocker arm.

11. The method of claim 10, further comprising:

driving the solenoid with a DC voltage to actuate the electromagnetic latch assembly;

wherein driving the coil comprises driving an AC current through the coil.

12. A method of providing diagnostic information for a rocker arm assembly, the method comprising:

providing the rocker arm assembly with a latch pin that translates between a first position and a second position and a solenoid operative to actuate the latch pin, wherein the solenoid has an electrical response characteristic that varies with latch pin position as the latch pin translates between the first position and the second position;

driving a circuit comprising the solenoid to actuate the latch pin from the first position to the second position;

measuring a current or a voltage in the circuit to obtain data;

analyzing the data to obtain diagnostic information relating to location of the latch pin or position of the rocker arm.

13. The method of claim 12, further comprising:

pulsing the circuit with a pulse insufficient in voltage or duration to actuate the latch pin;

wherein the current or the voltage is induced by the pulse.

14. The method of claim 12, further comprising:

repeatedly driving the circuit comprising the solenoid to actuate the latch pin;

wherein the measuring takes place when the circuit is not being driven; and the diagnostic information relates to whether a critical shift has taken place.

15. The method of claim 12, further comprising:

after driving the circuit comprising the solenoid to actuate the latch pin, cutting power to the circuit wherein the measuring takes place after cutting power to the circuit and while the circuit is not being driven;

the diagnostic information obtained by analyzing the data relates to whether the latch pin remained in the second position after cutting power to the circuit.

16. The method of claim 12, wherein analyzing the data comprises determining whether the circuit exhibits an effect consistent with residual magnetism or spring forces drawing the latch pin into the second position.

17. The method of claim 12, wherein the current or the voltage is induced by the driving of the circuit.

18. The method of claim 17, wherein the diagnostic information relates to whether the latch pin was actuated from the first position to the second position as a result of the driving of the circuit.

19. The method of claim 17, wherein:

the data relates to current in the circuit; and analyzing the data comprises determining whether the current decreased in magnitude over a second period following a first period over which the current was increasing in magnitude.

* * * * *